United States Patent

Kurosaki

[11] Patent Number: 5,292,158
[45] Date of Patent: Mar. 8, 1994

[54] LOCK MECHANISM AND LATCH DEVICE

[75] Inventor: Mutsuo Kurosaki, Toyota, Japan

[73] Assignee: Nifco, Inc., Japan

[21] Appl. No.: 75,919

[22] Filed: Jun. 14, 1993

Related U.S. Application Data

[63] Continuation of Ser. No. 762,931, Sep. 19, 1991, abandoned.

[30] Foreign Application Priority Data

| Sep. 27, 1990 | [JP] | Japan | 2-258306 |
| Nov. 13, 1990 | [JP] | Japan | 2-306878 |
| Nov. 13, 1990 | [JP] | Japan | 2-306879 |
| Nov. 30, 1990 | [JP] | Japan | 2-340669 |

[51] Int. Cl.⁵ .................................. F05L 19/02
[52] U.S. Cl. .................. 292/45; 292/DIG. 4; 292/19
[58] Field of Search ............ 292/45, 13, 19, DIG. 4, 292/DIG. 31, 213, 214, 215, 216, 80, 83, 336.3

[56] References Cited

U.S. PATENT DOCUMENTS

| 3,466,075 | 9/1969 | Fernandez et al. | 292/19 |
| 4,565,350 | 1/1986 | Rozek | 292/DIG. 4 |
| 4,616,861 | 10/1986 | Kurosaki | |
| 4,657,291 | 4/1987 | Kurosaki | |
| 4,713,951 | 12/1987 | Ros | 292/19 |
| 4,779,906 | 10/1988 | Kurosaki | 292/DIG. 4 |
| 4,792,165 | 12/1988 | Nishimura | 292/19 |
| 4,881,764 | 11/1989 | Takahashi et al. | 292/13 |

FOREIGN PATENT DOCUMENTS

| 354766 | 4/1980 | Austria . |
| 3535765 | 4/1986 | Fed. Rep. of Germany . |
| 3445460 | 6/1986 | Fed. Rep. of Germany . |
| 51-129190 | 10/1976 | Japan . |
| 61-163870 | 10/1986 | Japan . |

*Primary Examiner*—Eric K. Nicholson
*Attorney, Agent, or Firm*—Parkhurst, Wendel & Rossi

[57] ABSTRACT

A lock mechanism for causing an openable member such as a cover or a door of a box or the like to engage with or disengage from a main body as the openable member is pressed, and a latch device for retaining a latch body in the housing in a pushed-in state or in a withdrawn state. The center of rotation of each of a pair of arms of the latch device is formed on substantially the same line as a line of action of a force acting on a retaining surface of each of the arms for retaining a striker.

4 Claims, 30 Drawing Sheets des
LOCK MECHANISM AND LATCH DEVICE

This is a continuation of application Ser. No. 07/762,931 filed Sep. 19, 1991, now abandoned.

BACKGROUND OF THE INVENTION

1. Field of the Invention

The present invention relates to a lock mechanism in which, by pressing an openable cover of an audio apparatus, an audio-apparatus accommodating case or the like, or an openable member of such as a door of a box or the like, the openable cover or member is engaged with or disengaged from a main body. The present invention also relates to a latch device in which a latch body is retained in a pushed-in state or a withdrawn state in a housing so as to be provided with the same function as that of the lock mechanism.

2. Description of the Related Art

In a typical audio apparatus or the like, a latch device L is provided on an openable cover so as to retain the openable cover, as shown in FIG. 4.

As shown in the drawing, the latch device L is arranged such that each time a latch body 10 is pressed by a striker 34 in the direction of arrow A, a tracing member provided in a housing 14 moves halfway in a heart-shaped circulatory cam groove formed in the latch body 10, thereby allowing the latch body 10 to be retained in the housing 14 alternatively in a state in which the latch body 10 is pushed in and in a state in which it is withdrawn. Concurrently, as shown in FIG. 5, while a pair of arms 50 formed on the latch body 10 are respectively being pressed by a pair of rectangular frames 40 of the housing 14, the striker 34 fixed to the openable cover is clamped or released, thereby setting the openable cover in a closed state or in an openable state.

As shown in FIGS. 4 and 5, each of the arms 50, which are generally provided on the latch body 10, comprises a holder portion 50A for clamping the striker 34 and a hinge portion 50B serving as a center of rotation of the holder portion 50A. The arms 50 are formed of a flexible material such as nylon so as to facilitate the bending of the hinge portions 50B and reduce their frictional resistance with respect to the rectangular frames 40.

However, there has been a drawback in that if a large tensile load (acting in the direction of arrow B in FIG. 5) is continuously applied to the striker 34 while the respective holder portions 50A of the arms 50 are holding the striker 34, since the hinge portions 50A are flexible, the hinge portions 50B become elongated or offset in the direction in which the holder portions 50A are spaced apart from each other, thus causing the striker 34 to come off the holder portions 50A.

To give a more detailed description, when a tensile force W shown in FIG. 5 acts on each holder portion 50A via the striker 34, if the length of the arm is assumed to be L, a bending moment M ($M = WL/2$) acts on each hinge portion 50B. Accordingly, each hinge portion 50B rotates in the direction in which the holder portions 50A are spaced apart from each other. In addition, since a tensile force $\sigma$ ($\sigma = M/Z$, Z: coefficient of a cross section) due to the bending moment M acts on each hinge portion 50B, the hinge portions 50B become elongated in the direction of arrow B. As a result, the holder portions 50A become offset in the direction of arrow B while becoming spaced apart from each other.

Hence, there has been the drawback that the striker 34 is liable to come off the holder portions 50A.

In addition, since an outer side of the hinge portion 50B is formed as a curved portion D, there has been another drawback in that if the tensile force W acts, the curved portion D is pulled, so that the hinge portion 50B becomes elongated.

In a typical latch device such as the one shown in FIG. 14, a rear end portion 182B of a tracing member 182 moving in a circulatory cam groove 180 in a circulatory manner is rotatably inserted in a fitting hole 184 formed in the unillustrated housing. In addition, the tracing member 182 is pressed by a pressing leaf spring 188 secured to the housing by means of a screw 186 such that the tracing member 182 will not come out of the fixing hole 184.

However, with the above-described structure for fitting the tracing member 182, the tracing member 182 cannot be fit in the housing from the outside thereof. For this reason, it has been necessary to fixedly hold the tracing member in the housing in advance, and then to allow a tip portion 182A of the tracing member 182 to be fitted into the circulatory cam groove 180 formed in a latch body 190 which is inserted into the rear portion of the housing.

For this reason, in the event that the tip portion 182A of the tracing member 182 is shaken during the assembling operation, the tip portion 182A cannot be inserted into the circulatory cam groove 180, and the tip portion 182A of the tracing member 182 is brought into contact with a different portion of the latch body 190. Hence, a drawback has been encountered in that the latch body 190 cannot be inserted into the housing, so that the assembling of the latch device has been troublesome. In addition, a pressing member (e.g., a pressing leaf spring 188) is required for pressing the tracing member 182, with the result that the number of component parts used disadvantageously increases and the assembling efficiency has been low.

Meanwhile, in a center cluster portion of an automobile, a push-open type ash pan is provided which automatically slides out upon pressing of its cover.

This push-open type ash pan is provided with a lock mechanism 280 as shown in FIG. 30. This lock mechanism 280 operates as follows: If a front face portion of the unillustrated ash pan is pushed in the direction of arrow R, a tracing member 284 fixed to a rear end portion of the ash pan is inserted into a heart-shaped circulatory cam groove 282 formed in a box. The inserted tracing member 284, when thus pressed, moves in the heart-shaped circulatory cam groove 282 in a circulating manner, and when the tracing member 284 engages a recessed (cusp) portion 292 of the heart-shaped circulatory cam groove 282, the tracing member 284 retains the ash pan in a state in which the ash pan is pushed in.

In the lock mechanism 280 shown in FIGS. 30 and 31, a stepped portion 288 is provided so that the tracing member 284 can circulate in a set direction (in the direction of arrow Q) in the circulatory cam groove 282, so as to prevent the tracing member 284 from circulating in an opposite direction. In addition, an urging means 290 is provided separately for urging a tip portion 286 of the tracing member 284 vertically toward the bottom surface of the circulatory cam groove 282 to ensure that the tracing member 284 will circulate with its tip portion 286 brought positively into sliding contact with the bottom surface of the circulatory cam groove 282.

With the mechanism in which the tip portion 286 of the tracing member 284 is caused to slide on the bottom surface of the circulatory cam groove 282, a shortcoming has been experienced in that, owing to the friction of the bottom surface of the groove with the tip portion 286 of the tracing member 284, the circulatory cam groove 282 sometimes becomes worn or deformed, and the stepped portion 288 is scraped off, thereby causing the tracing member 284 to circulate in the opposite direction.

In the state in which the ash pan is pushed in, the tracing member 284 is retained at the recessed portion 292 formed in the circulatory cam groove 282, and the state in which the ash pan is pushed in is maintained against the urging force of an unillustrated compression coil spring. However, since the urging force of the compression coil spring is supported at one recessed portion 292, the recessed portion 292 is liable to become damaged. Hence, the rupture strength of the lock mechanism 280 has been low.

In addition, since the tip portion 286 of the tracing member 284 is urged towards the bottom surface of the circulatory cam groove 282, there is a need to provide the urging means 290 separately, so that the number of component parts used disadvantageously increases and the assembling efficiency has been low.

Although the tracing member 284 is usually formed of a metal material into the shape of a lever, there have been cases where if fabrication accuracy at the time of its formation is poor, the tracing member 284 scrapes off the bottom surface of the circulatory cam groove 282, or the tracing member 284 undergoes deformation due to its frictional resistance with respect to the circulatory cam groove 282.

In the case of a latch device employing the above-described lock mechanism 280, since it is necessary to form the stepped portion 288 in the circulatory cam groove 282 provided in the latch body, and to provide the tracing member 284 with the urging means 290, the housing which accommodates the latch body and the tracing member is required to have a minimum thickness. For this reason, it has been difficult to make the latch device thin beyond this restriction.

SUMMARY OF THE INVENTION

In view of the above circumstances, an object of the present invention is to provide a latch device featuring an arm structure wherein the bending performance of a pair of hinge portions is excellent and the hinge portions do not undergo deformation even with respect to a large tensile force.

Another object of the present invention is to provide a latch device featuring a tracing-member fitting structure which allows the number of component parts used to be reduced, which facilitates the assembly of the tracing member, and which provides the trace member with a large supporting strength.

Still another object of the present invention is to provide a lock mechanism having a smaller number of component parts used, capable of preventing the wear of a circulatory cam groove, and having large rupture strength.

A further object of the present invention is to provide a thin latch device making use of the lock mechanism.

In accordance with a first aspect of the present invention, an arm structure of a latch device for causing an openable member to engage with or disengage from a main body is comprised of: a housing fitted on the main body; a striker fitted on the openable member; and a latch body which is retained by the housing in a state in which the latch body is pushed into the housing and in a state in which the latch body is withdrawn in the housing, the latch body having a pair of arms for clamping the striker by rotating in a mutually approaching direction, wherein the center of rotation of each of the arms is formed on substantially the same line as a line of action of a force acting on a retaining surface of each of the arms for retaining the striker relative to a force acting in a direction in which the striker is released with the striker clamped by the arms.

In accordance with a second aspect of the present invention, a tracing-member fitting structure of a latch device for causing an openable member to engage with or disengage from a main body is comprised of: a housing fitted on the main body; a latch body accommodated in the housing, the latch body being urged in a direction in which the latch body is withdrawn, and the latch body being retained by the housing in a state in which the latch body is pushed into the housing and in a state in which the latch body is withdrawn in the housing; a circulatory cam groove formed on the latch body; a tracing member for alternately maintaining the state in which the latch body is pushed into the housing and the state in which the latch body is withdrawn in the housing, by circulating in the circulatory cam groove each time an operation of pushing in the latch body is effected; a fitting hole formed in the housing and allowing a distal end portion of the tracing member to be fitted in the housing; a guide hole provided in the housing, communicating with the fitting, and adapted to guide the movement of the tracing member; a slanted guide surface provided in the housing, communicating with the guide hole, and adapted to guide a rear end portion of the tracing member into the housing; and a fitting groove provided in the housing, formed continuously with the slanted guide surface, and adapted to receive the rear end portion of the tracing member.

In accordance with a third aspect of the present invention, a lock mechanism which has the function of causing an openable member to engage with or disengage from a main body and includes a first lock member and a second lock member is comprised of: a pair of circulatory guide paths formed on different portions of the first lock member and having mutually different configurations for guiding; and resilient tracing means disposed in the second lock member and adapted to move relative to the first lock member so as to alternately maintain a state of engagement with the first lock member and a state of disengagement from the first lock member, wherein the tracing means traces the pair of circulatory guide paths through movement thereof relative to the first lock member and resilient restoring force of the tracing means occurring as the tracing means is pressed relatively by side walls of the pair of circulatory guide paths by means of the relative movement, the tracing means being in a state of noncontact with bottom surfaces of the circulatory guide paths during tracing.

In accordance with a fourth aspect of the present invention, a latch device for causing an openable member to engage with or disengage from a main body is comprised of: a housing fitted on the main body; a latch body accommodated in the housing, the latch body being urged in a direction in which the latch body is withdrawn, and the latch body being retained by the housing in a state in which the latch body is pushed into the housing and in a state in which the latch body is withdrawn in the housing; a pair of circulatory guide paths formed on different portions of the latch body and having mutually different configurations for guiding; resilient tracing means disposed in the housing and adapted to alternately maintain the state in which the latch body is pushed into the housing and the state in which the latch body is withdrawn in the housing, by circulating in the circulatory guide paths each time an operation of pushing in the latch body is effected, wherein the tracing means traces the pair of circulatory guide paths through the pushing-in operation and resilient restoring force of the tracing means occurring as the tracing means is pressed relatively by side walls of the pair of circulatory guide paths by means of the pushing-in operation, the tracing means being in a state of noncontact with bottom surfaces of the circulatory guide paths during tracing.

In the above-described arm structure of the latch device in accordance with the first aspect of the invention, when the openable member is closed, the latch body is pressed by the striker and is retained in a pushed-in state in the housing secured to the main body of an apparatus. At this juncture, the pair of arms disposed on the latch body are pressed by the frame of the housing, and rotate in a mutually approaching direction, thereby clamping the striker.

With the striker held by the arms, if a force acts on the striker in a direction in which the striker is released from the arms, the force of the striker acting in the direction in which the striker is released acts on a retaining surface of each of the arms for retaining the striker. However, since the center of rotation of each of the arms is located on the substantially the same line as the line of action of a force acting on the retaining surface of the arm, a bending moment does not act on the center of rotation. Accordingly, since only the tensile force acts on the center of rotation, there occurs no rotating force acting in the direction in which the arms are spaced apart from each other, nor a tensile force due to the bending moment.

Furthermore, since the outer side of a central portion of rotation is arranged to be parallel with the line of action of the tensile force, elongation of a hinge portion is inhibited.

In the above-described tracing-member fitting structure of the latch device in accordance with the second aspect of the invention, the tracing member is fitted as follows.

The tip portion of the tracing member is fitted into the housing through a fitting hole formed in the housing of the latch device. Then, with the tip portion of the tracing member inserted in the housing, the rear end portion of the tracing member is moved to a guide hole communicating with the fitting hole. The rear end portion of the tracing member which has moved to the guide hole is guided to a slanted guide surface communicating with the guide hole, and is pushed in until it reaches a fitting groove. At this juncture, since a portion of communication between the fitting groove and the slanted guide surface is formed to be slightly smaller than the outside diameter of the tracing member, the tracing member is fitted in the fitting groove in such a manner as to expand this portion of communication between the fitting groove and the slanted guide surface. Accordingly, once the tracing member is fitted in the fitting groove, the tracing member is prevented from coming off easily.

Furthermore, since the fitting groove and the slanted guide surface serve to integrally support the tracing member with respect to a tensile force acting thereon, this arrangement exhibits large supporting strength.

In the lock mechanism in accordance with the third aspect of the invention, when the tracing member disposed in the second lock member is inserted into a pair of circulatory guide paths provided in the first lock member, the tracing member circulates about the circulatory guide paths in a fixed direction by means of its movement relative to the first lock member.

At this juncture, the tip portions of the tracing member are inserted in such a manner that they will not come into contact with the bottom surfaces of the circulatory guide paths of the first lock member, and only the side surface portions of the tip portions of the tracing member are brought into contact with the side walls of the circulatory guide paths, respectively. Therefore, the bottom surfaces of the circulatory guide paths are not worn by the tracing member. Meanwhile, since the configurations of the pair of circulatory guide paths are mutually different, the tracing member tracing the circulatory guide paths circulates the circulatory guide paths while it is pressed by the side walls of the circulatory guide paths and a resilient restoring force is hence being imparted thereby through its movement relative to the first lock member. For this reason, the tracing member is urged in the circulating direction by the resilient restoring force of the tracing member. Hence, even if stepped walls for preventing the backward movement of the tracing member in the circulatory guide paths are not provided, the tracing member circulates in the fixed direction without being moving backwardly.

Furthermore, since the tracing member is inserted in the pair of circulatory guide paths, the holding of the tracing member is effected at two portions of the second lock member.

In the latch device in accordance with the fourth aspect of the invention, the tracing member circulates in the circulatory guide paths each time the operation of pushing in the latch body is effected, so as to alternately hold the latch body in the state of being pushed in the housing and in the state of being withdrawn from the housing.

Since the arrangements of the tracing member and the circulatory guide paths are the same as those of the third aspect, a description of the operation will be omitted.

As described above, with the arm structure of the latch device in accordance with the first aspect of the invention, even if a large tensile force acts on the striker when the striker is clamped, no bending moment occurs in the hinge portions. Accordingly, the hinge portions are prevented from rotating in the direction in which the holder portions are spaced apart from each other, and the hinge portions are prevented from becoming offset in the pulling direction.

Furthermore, since the outer side of each of the hinge portions is formed to be parallel with the line of action of the tensile force, the hinge portions are prevented from being elongated.

For this reason, since the structure provided is such that even if the arms are formed of a flexible material, the offsetting of the holder portions is prevented, and the striker is prevented from coming off the holder portions.

With the tracing-member fitting structure of the latch device in accordance with the second aspect of the invention, no fixing member is required separately for fixing the tracing member in the housing, so that the number of component parts used can be reduced, and fitting performance improves. In addition, since the tracing member can be fitted from outside the housing after the latch body has been inserted into the housing, the assembling of the tracing member is facilitated.

Furthermore, since the opposite sides of the tracing member are supported by the fitting groove formed integrally with ribs provided in the housing, it is possible to provide a latch device having high strength for supporting the tracing member.

With the lock mechanism in accordance with the third aspect of the invention and the latch device in accordance with the fourth aspect of the invention, since the arrangement provided is such that the side walls of the circulatory guide paths are traced by the side surfaces of distal end portions of the tracing member, the bottom surfaces of the circulatory guide paths are prevented from becoming worn. In addition, since it is unnecessary to provide an urging means separately, the number of component parts used can be reduced.

Since the tracing movement in the opposite direction to the circulating direction is prevented by making use of the resilient restoring force of the tracing member, it is unnecessary to form steps on the circulatory guide paths, so that the overall structure can be made compact.

In addition, since the prevention of the coming off of the tracing member is effected at two portions in the circulatory guide paths, the supporting strength is high, so that the rupture strength of the lock mechanism can be increased.

DETAILED DESCRIPTION OF THE PREFERRED EMBODIMENTS

Overall Configuration of Latch Mechanism

Figure 3:
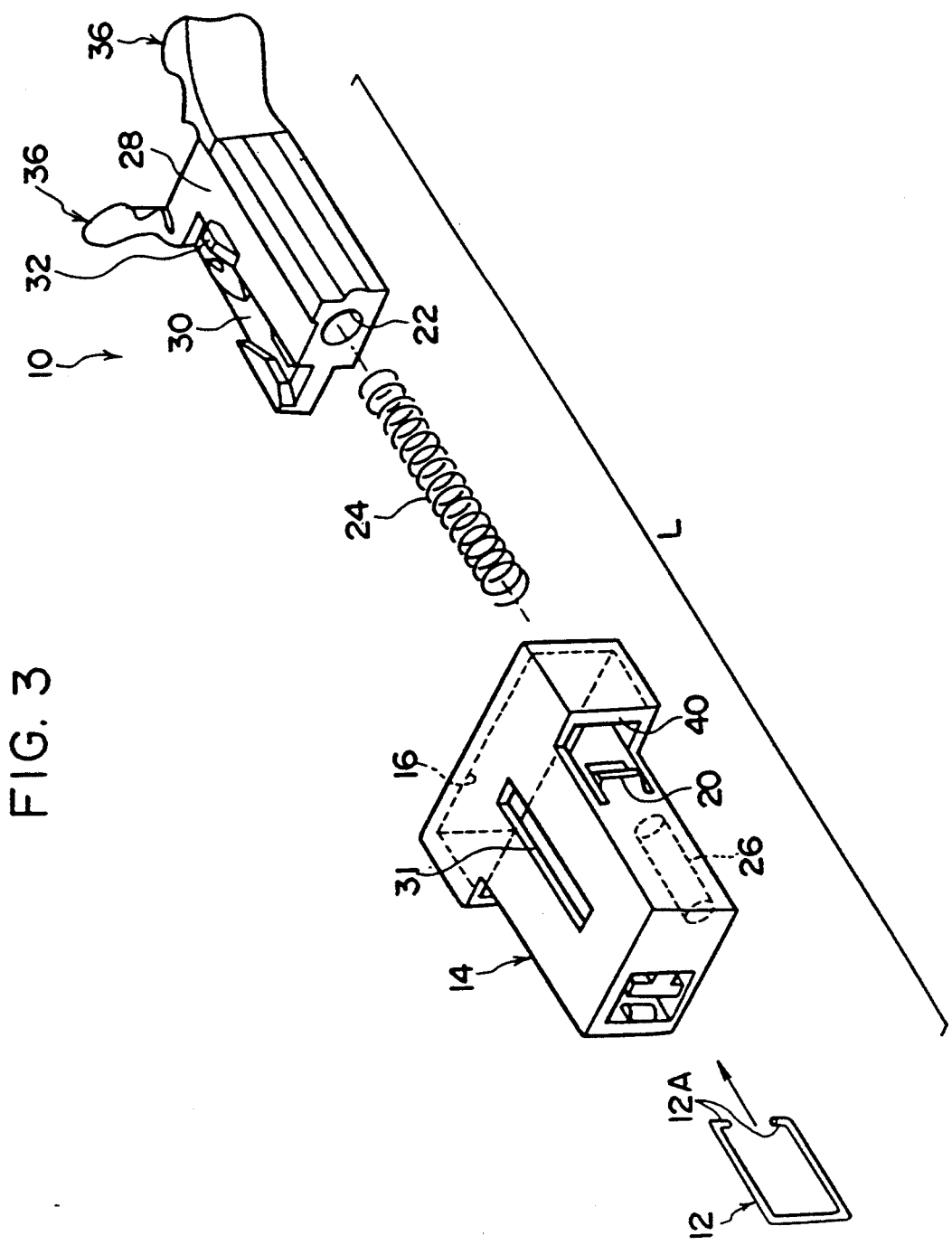
FIG. 3 is an exploded perspective view of a latch device having the arms in accordance with the embodiment of the first aspect of the invention.
Figure 4:
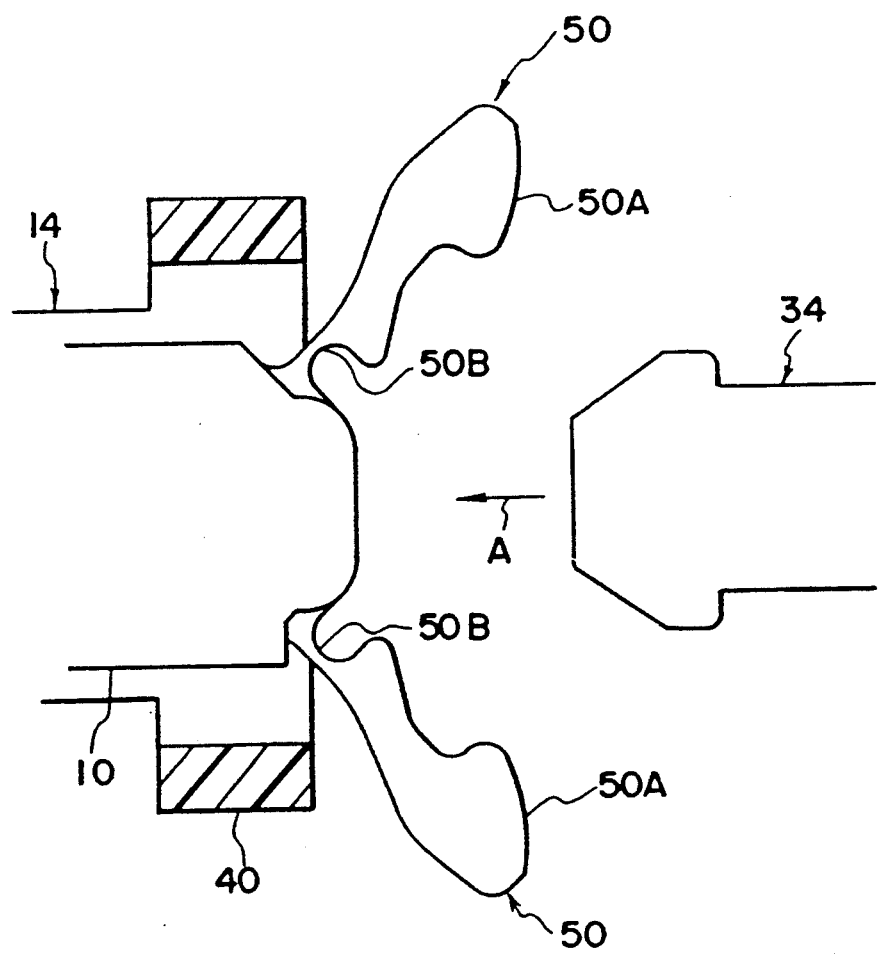
FIG. 4 is a plan view illustrating a state before conventional arms clamp the striker.

As shown in FIG. 3, a latch device L comprises a latch body 10 and a housing 14 for accommodating a tracing member 12 therein.

The housing 14 has a box-shaped configuration of a predetermined thickness, and the latch body 10 is inserted into an opening 16 formed at a longitudinal end of the housing 14. A rectangular frame 40 for fixing the housing 14 to an audio apparatus or the like is formed in such a manner as to define the opening 16. A pair of projections 20 are formed on opposite side surfaces of the housing 14, respectively, in correspondence with the laterally projecting portions of the rectangular frame 40. This arrangement is provided to allow an unillustrated fixing plate to be clamped by the laterally projecting portion of the rectangular frame 40 and the projection 20 on each side of the housing 14, so as to fix the housing 14 to the fixing plate.

The latch body 10 which is inserted into the housing 14 is substantially rectangular parallelepipedal in configuration, and a circular hole 22 is formed along the longitudinal direction of the latch body 10, extending from an insertion end thereof. A compression coil spring 24 is accommodated in the circular hole 22. A portion of the compression coil spring 24 projects from the circular hole 22 and is fitted in a spring-bearing hole 26. As a result, the latch body 10 is constantly urged by the compression coil spring 24 in the direction in which the latch body 10 is pulled out of the housing 14.

A recessed portion 28 is formed on each of the top and bottom surfaces of the latch body 10. A circulatory cam groove 30 is formed in each of the recessed portions 28. Each tip portion 12A of the tracing member 12 is inserted into the respective circulatory cam groove 30 and is adapted to move in the circulatory cam groove 30 in a circulating manner while being brought into contact with the wall surface of the circulatory cam groove 30, so as to retain the latch body 10 in its pushed-in state.

A projection 32 is formed on the top surface of the latch body 10, and is fitted in an elongated guide hole 31 formed in the housing 14. As a result, as the projection 32 moves in the elongated guide hole 31, the latch body 10 is reciprocatively moved relative to the housing 14. Also, as the projection 32 is brought into contact with one end of the elongated guide hole 31, further movement of the latch body 10 in the direction in which it is pulled out is prevented against the urging force of the compression coil spring 24.

The first aspect of the present invention relates to the structure of the arms of the latch device. An embodiment thereof will be described hereinunder.

Figure 1:
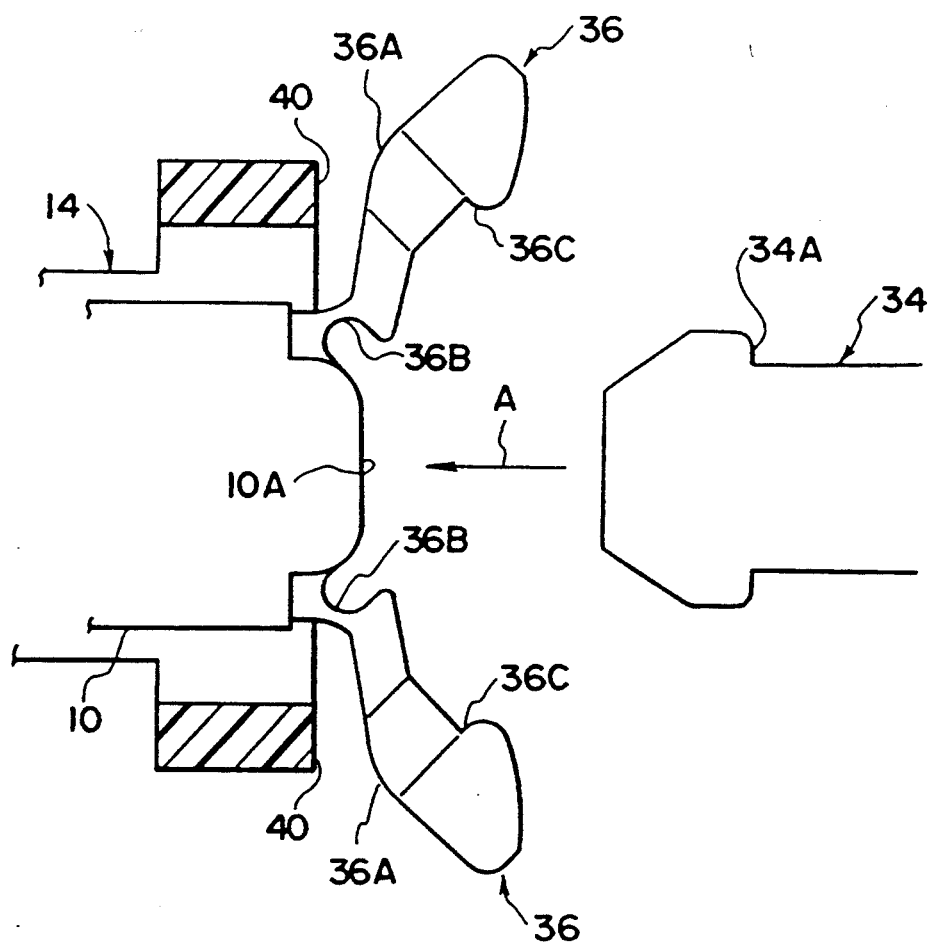
FIG. 1 is a plan view illustrating a state before a pair of arms in accordance with an embodiment of a first aspect of the invention clamps a striker.

As shown in FIG. 1, a pair of arms 36 for clamping a striker 34 are provided on the latch body 10. Each arm 36 comprises a holder portion 36A and a hinge portion 36B. The holder portions 36A in their free state, i.e., before the latch body 10 is pushed into the housing 14 in the direction of arrow A, are formed to be spaced apart from each other. Formed at the distal end of the holder portion 36A is a hook portion 36C projecting perpendicularly to the axis of the holder portion 36A. These hook portions 36C are adapted to abut against an enlarged-diameter portion 34A of the striker 34 so as to prevent the striker 34 from being pulled out.

The hinge portions 36B with a small thickness are formed at the respective root portions of the arms 36. These hinge portions 36B serve as fulcrums when the holder portions 36B rotate in the mutually approaching direction.

Figure 2:
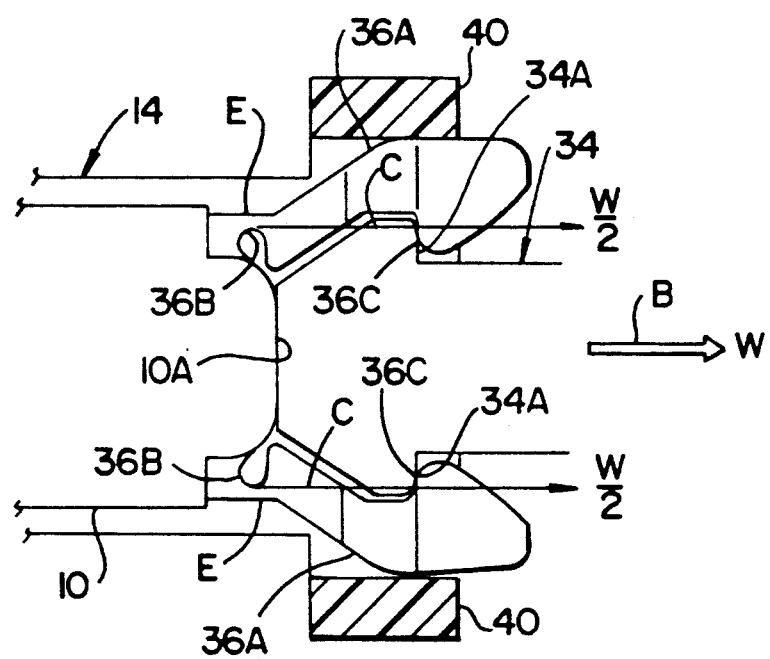
FIG. 2 is a plan view illustrating a state after the pair of arms in accordance with the embodiment of the first aspect of the invention has clamped the striker.

As shown in FIG. 2, in the state in which the striker 34 is held by the holder portions 36A, each of the hinge portions 36B is formed in such a manner as to be located on an extension of a line of action C of a tensile force W in the direction of arrow B acting on the hook portion 36C via the striker 34.

In addition, an outer side E of each of the hinge portions 36B is formed in such a manner as to be parallel with the line of action C of the tensile force.

The operation of this embodiment will be described hereinbelow.

As shown in FIG. 1, when the latch body 10 is not pushed in by the striker 34, the holder portions 36A of the arms 36 are spaced apart from each other.

Then, as shown in FIG. 2, when a central portion 10A of the latch body 10 is pushed in the direction of arrow A by the striker 34, the latch body 10 is accommodated in the housing 14. Concurrently, as the outer sides of the holder portions 36A are pressed by the rectangular frame 40, and the hinge portions 36B, the holder portions 36A rotate in the mutually approaching direction with the hinge portions 36B as the fulcrums. For this reason, the striker 34 is clamped by the holder portions 36A, thereby retaining the openable cover.

Next, if a large tensile force W (acting in the direction of arrow B) acts on the striker 34 with the striker 34 thus held, a tensile force W/2 acts on the mutually abutting portions of the enlarged-diameter portion 34A and the hook portion 36C. Although this tensile force W/2 acts on each hinge portion 36B, since the hinge portion 36B is located on the line of action C of the tensile force W/2, no bending moment occurs in the hinge portions 36B.

Accordingly, the hinge portions 36B do not rotate in the direction in which the holder portions 36A are spaced apart from each other, and the tensile force resulting from the bending moment does not occur in the hinge portions 36B. The hinge portions 36B are prevented from becoming offset in the direction of arrow B insofar as the tensile force W/2 does not exceed the allowable tensile stress of each arm 36.

Figure 5:
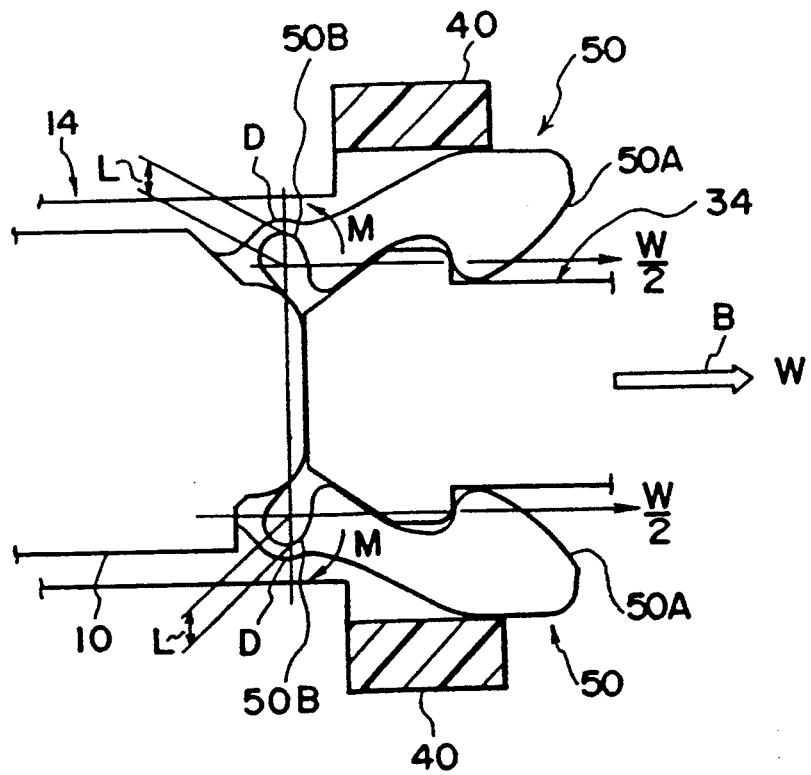
FIG. 5 is a plan view illustrating a state after the conventional arms have clamped the striker.

Even if the hinge portion 36B is slightly offset from the extension of the line of action C, the outer side E of the hinge portion 36B is formed in such a manner as to be parallel with the line of action C of the tensile force. For this reason, since there is no leeway in which the curved portion D is elongated in the manner of a hinge portion 50B shown in FIG. 5, the hinge 36B is prevented from being elongated. It should be noted that the configuration of the arm 36 is not confined to the configuration shown in this embodiment, and it suffices if the structure provided is such that, with the striker 34 held by the holder portions 36B, each hinge portion 36B is located on the line of action of the tensile force acting on the holder portion 36A.

A description will now be given of a first embodiment of a second aspect of the present invention.

Figure 6:
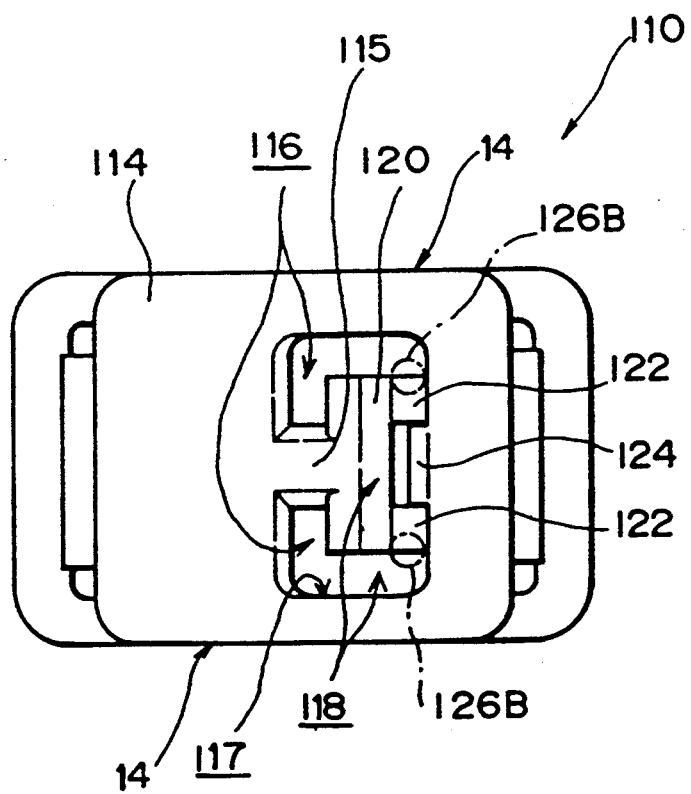
FIG. 6 is a rear view of the latch device illustrating a tracing-member fitting structure of the latch device in accordance with a first embodiment of a second aspect of the invention.
Figure 7:
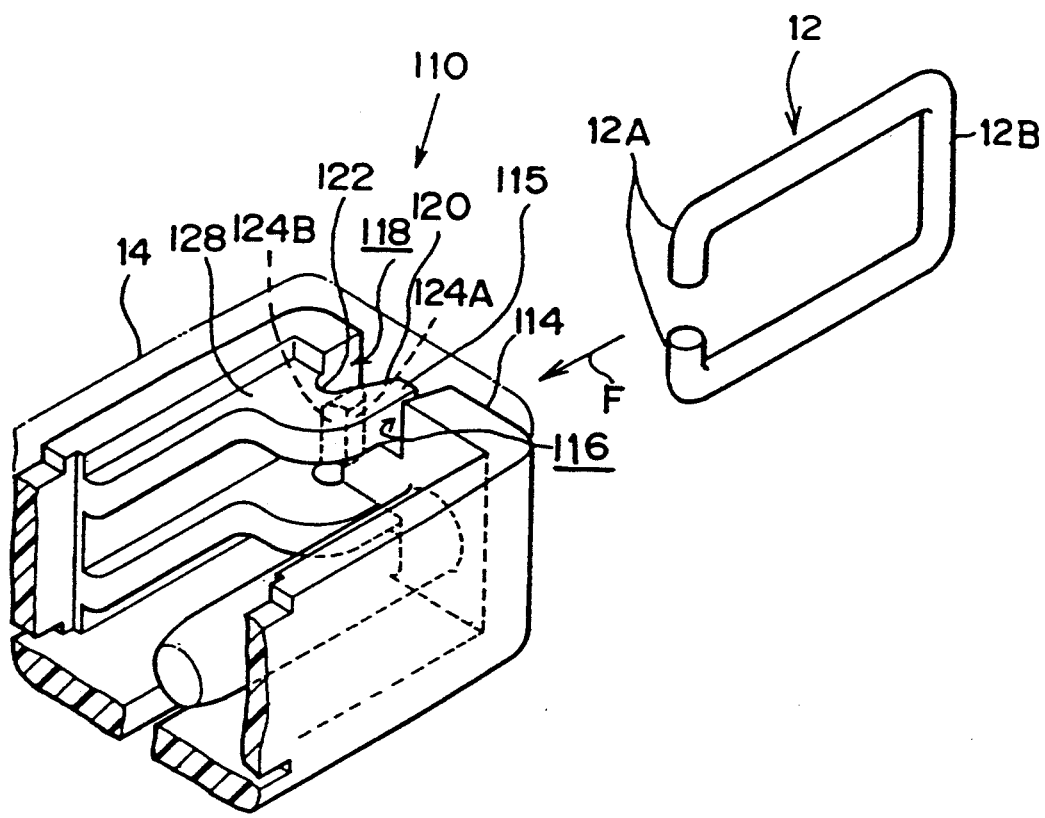
FIG. 7 is a perspective view illustrating the tracing-member fitting structure of the latch device in accordance with the first embodiment of the second aspect of the invention.

FIGS. 6 and 7 illustrate a tracing-member fitting structure 110 of the latch device in accordance with the first embodiment of the second aspect of the invention.

A housing 14 has a box-shaped configuration of a predetermined thickness, and a rectangular through hole 117 is formed in a rear wall 114 of the housing 14 (see FIG. 6). As shown in FIG. 6, in this through hole 117, a substantially T-shaped support piece 115 projects from the left-hand side of the drawing toward the center of the through hole 117, while a tongue piece 124 projects from the right-hand side of the drawing toward the center of the through hole 117.

As viewed in the drawing, an upper and a lower space which are each defined between the head portion of the T-shaped support piece 115 projecting inwardly in the through hole 117 and the left-hand side of the through hole 117 serve as fitting holes 116 into which tip portions 12A (see FIG. 8) of the tracing member 12 are inserted. Meanwhile, as viewed in the drawing, an upper and a lower space which are respectively defined between an upper tip of the head portion of the T-shaped support piece 115 and an upper side of the through hole 117 and between a lower tip of the head portion of the support piece 115 and a lower side of the through hole 117 communicate with an upper end of the upper fitting hole 116 and a lower end of the lower fitting hole 116, respectively. Together with the fitting holes 116, these upper and lower spaces respectively form substantially L-shaped through-hole portions for guiding a rear end portion 12B (see FIG. 8) of the tracing member 12, and are formed as guide holes 118 for guiding the rear end portion 12B (see FIG. 8) of the tracing member 12.

A portion of the head portion of the T-shaped support piece 115 facing the right-hand side of the through hole 117 is provided with a slanted surface such that the distance between the same and the right-hand side of the through hole 117 becomes smaller in the direction in which the tracing member 12 is inserted. This slanted portion is formed as a guide plate 120 for guiding the rear end portion 12B of the tracing member 12 into the housing 14 (see FIG. 9). A pair of arcuate fitting grooves 122 for holding the rear end portion 12B of the tracing member 12 are formed at an innermost end portion of the guide plate 120, i.e., at the portion where the distance between the guide plate 120 and the right-hand side of the through hole 117 is the smallest. In addition, the inner half peripheries of the pair of fitting grooves 122 are respectively formed in a pair of parallel ribs 128 provided on the housing 14. The tensile force of the tracing member 12 acting in the direction of arrow F is supported by these ribs 128 (see FIG. 7).

Figure 9:
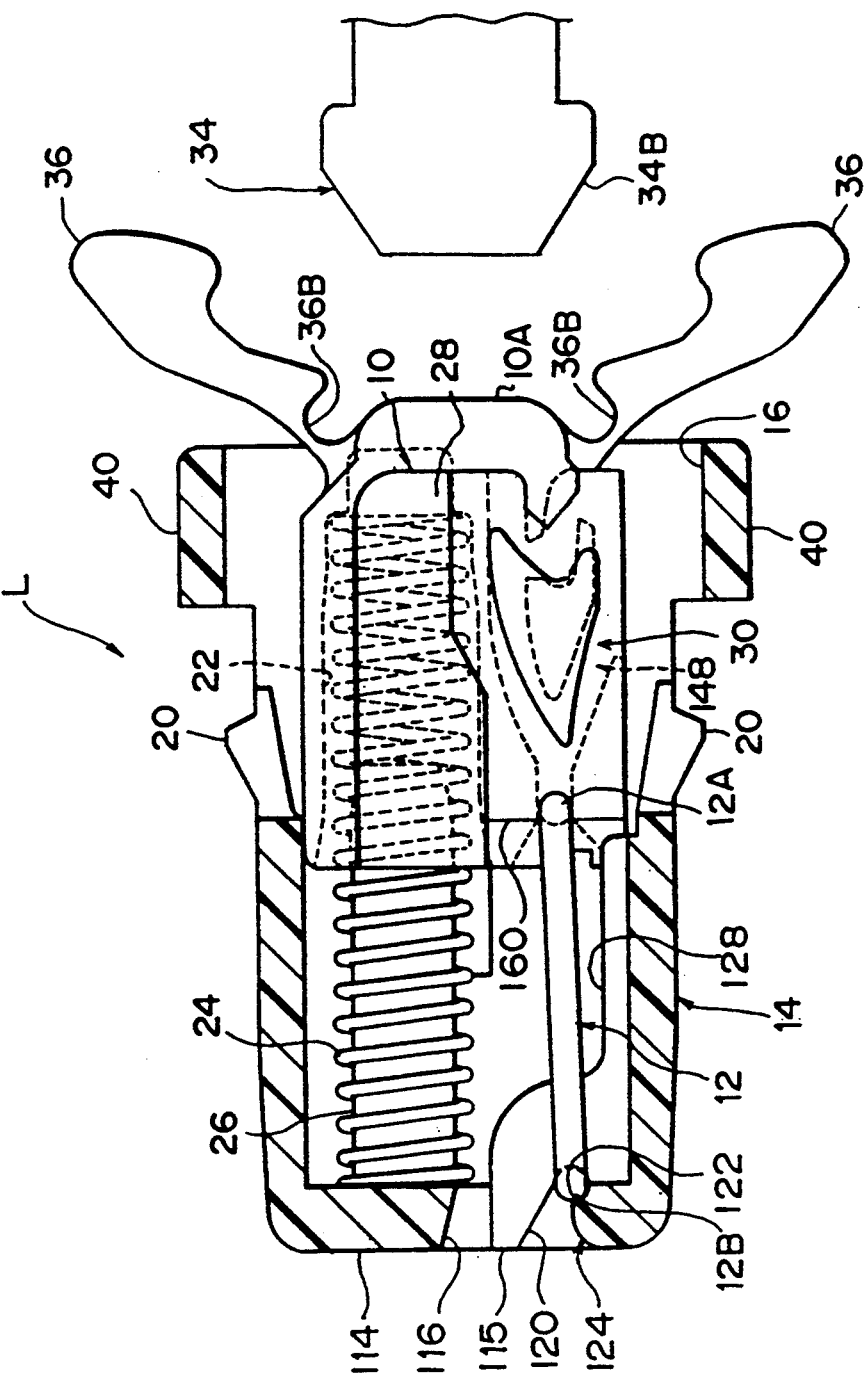
FIG. 9 is a cross-sectional view of the latch device in accordance with the first embodiment of the second aspect of the invention.
Figure 10:
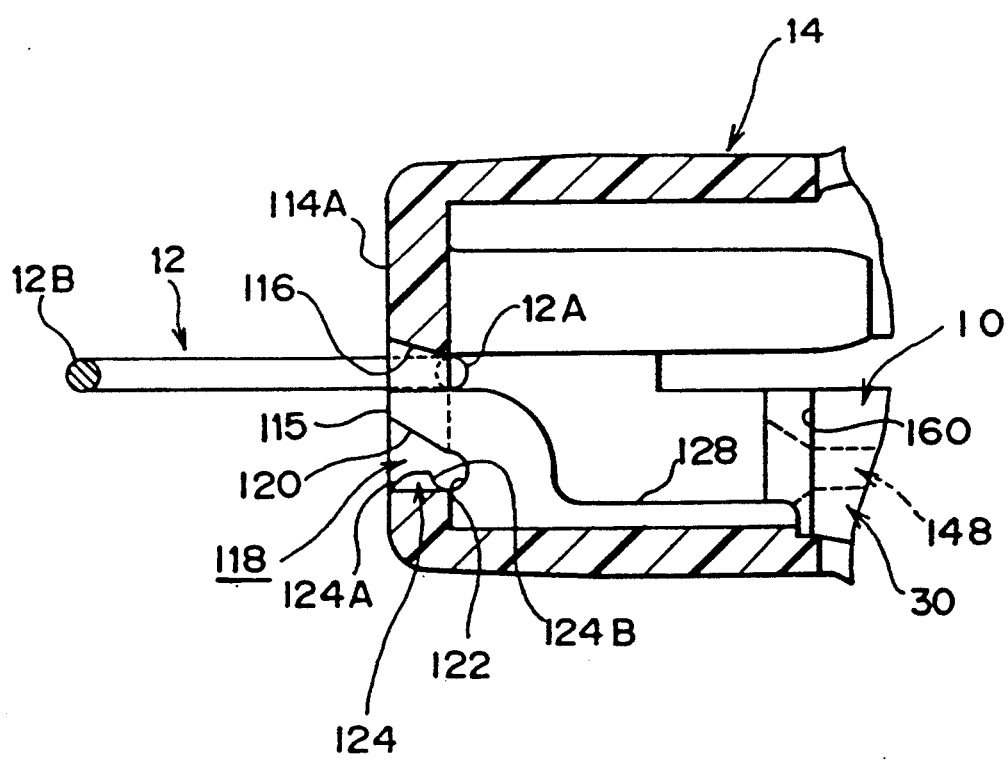
FIGS. 10 to 12 are partial cross-sectional views illustrating the procedure of fitting a tracing member in a tracing-member fitting mechanism of the latch device in accordance with the first embodiment of the second aspect of the invention.

As shown in FIG. 7, a curved portion 124A whose rear end in the through hole 117 projects toward the guide plate 120, as shown in FIG. 10, is formed on the tongue piece 124 disposed between the pair of ribs 128 and projecting in the direction of narrowing the inlet portion of the fitting grooves 122. An end portion of the curved portion 124A of the tongue piece 124 forms a quarter arc portion 124B of each of the fitting grooves 122. By virtue of this quarter arc portion 124B, together with the half arc portions formed in the fitting grooves 122, the coming off of the rear end portion 12B of the tracing member 12 is prevented (see FIG. 9).

Figure 8:
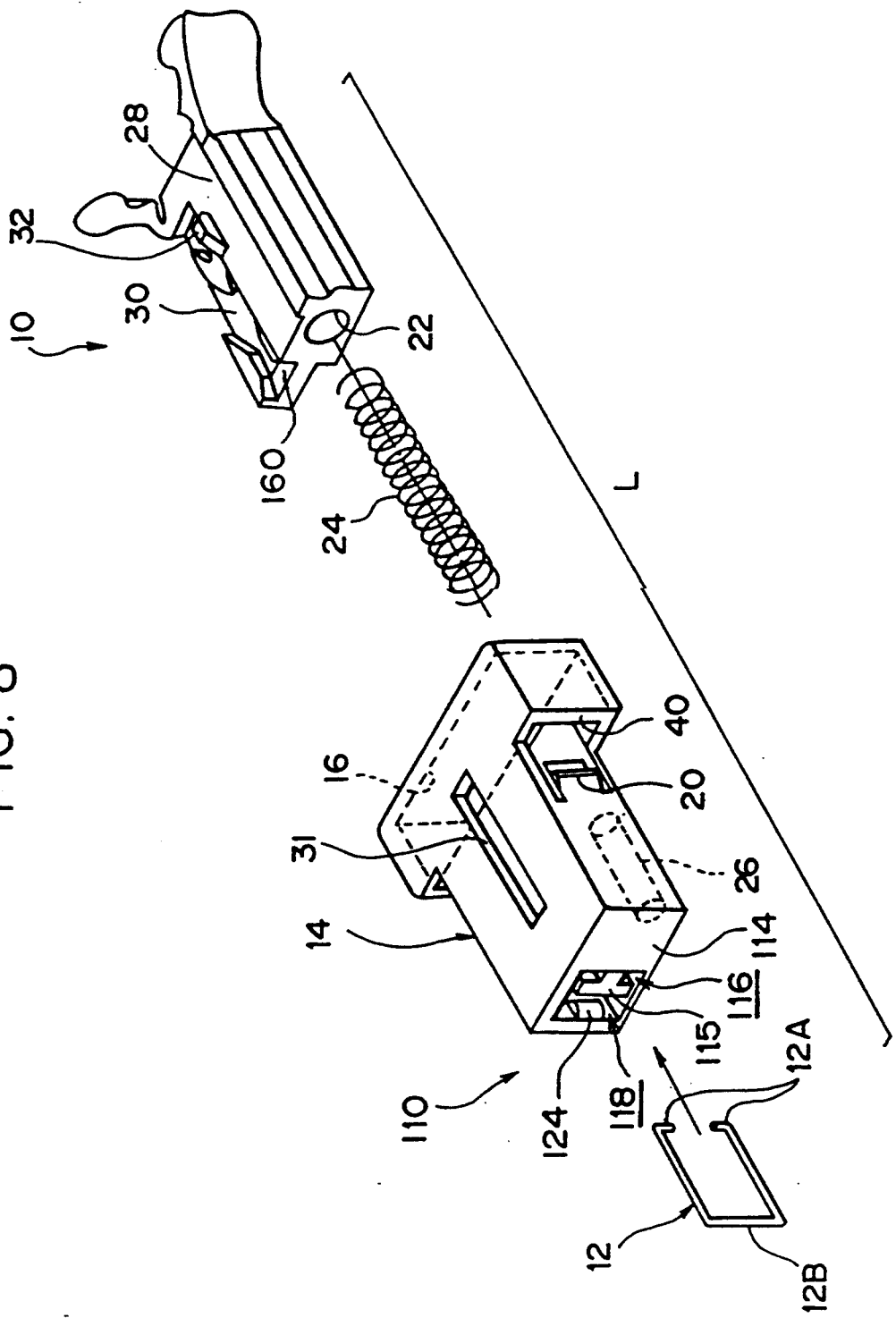
FIG. 8 is an exploded perspective view of the latch device in accordance with the first embodiment of the second aspect of the invention.

Next, a description will be given of the latch device provided with the above-described structure for fitting the tracing member. As shown in FIG. 8, the structures of the latch body 10, the external configuration of the housing 14, and the compression coil spring 24 are the same as those described with respect to the above-described embodiment of the first aspect. Therefore, these component parts and their portions will be denoted by the same reference numerals, and a description thereof will be omitted here.

The recessed portion 28 is formed on each of the top and bottom surfaces of the latch body 10. Circulatory cam grooves 30, 148 (see FIG. 9) are respectively formed in the recessed portions 28. The tip portions 12A of the tracing member 12 are respectively inserted into the circulatory cam grooves 30, 148 and are adapted to move in the circulatory cam grooves 30, 148 in a circulating manner while being brought into contact with the respective wall surfaces of the circulatory cam grooves.

The tracing member 12 has a substantially C-shaped configuration formed by cutting off a portion of a ring. The gap between the tip portions 12A is set to be greater than the distance between the bottom surfaces of the circulatory cam grooves 30, 148.

The projection 32 is formed on the top surface of the latch body 10, and is fitted in the elongated guide hole 31 formed in the housing 14. As a result, as the projection 32 moves in the elongated guide hole 31, the latch body 10 is reciprocatively moved relative to the housing 14. Also, as the projection 32 is brought into contact with one end of the elongated guide hole 31, further movement of the latch body 10 in the direction in which it is pulled out is prevented against the urging force of the compression coil spring 24.

As shown in FIG. 9, the pair of arms 36 are provided on the latch body 10 on the side away from the side of insertion into the housing 14, and their distal ends are spaced apart from each other. An enlarged diameter end portion 34B of the striker 34 secured to the unillustrated openable cover is inserted between the arms 36 to press a central portion 10A of the arms 36, so as to push the latch body 10 into the housing 14. When the latch body 10 is thus pushed in by the striker 34, the outer sides of the arms 36 are brought into contact with the rectangular frame 40, so that the arms 36 rotate in the mutually approaching direction with the hinges 36B serving as fulcrums. As a result, the enlarged-diameter end portion 34B of the striker 34 is held by the arms 36, thereby closing the openable cover.

A description will now be given of the procedure of assembling the latch device having the structure for fitting the tracing member in accordance with the first embodiment of the second aspect of the invention.

First, the compression coil spring 24 is inserted into the circular hole 22 formed in the latch body 10 or into the spring-bearing hole 26 provided in the housing 14 (see FIG. 8).

The latch body 10 is then pushed into the housing 14 with the compression coil spring 24 being urged, and the projection 32 is inserted into the elongated guide hole 31 formed in the housing 14, thereby accommodating the latch body 10 in the housing 14 (see FIGS. 8, 9).

As shown in FIG. 10, the tip portions 12A of the tracing member 12 are then inserted into the housing 14 through the fitting holes 116.

Figure 11:
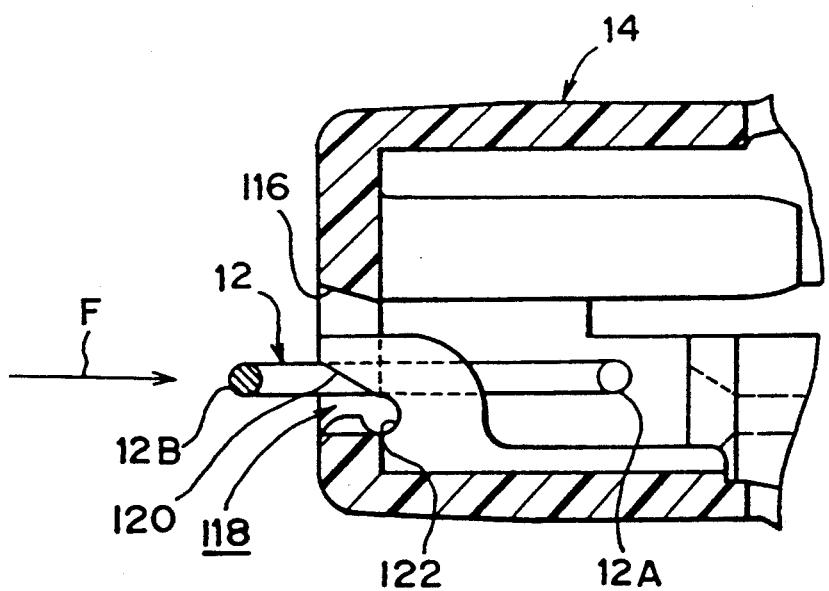

Subsequently, with the tip portions 12A of the tracing member 12 inserted in the housing 14, the rear end portion 12B of the tracing member 12 is moved toward the guide holes 118 (see FIG. 11).

Figure 12:
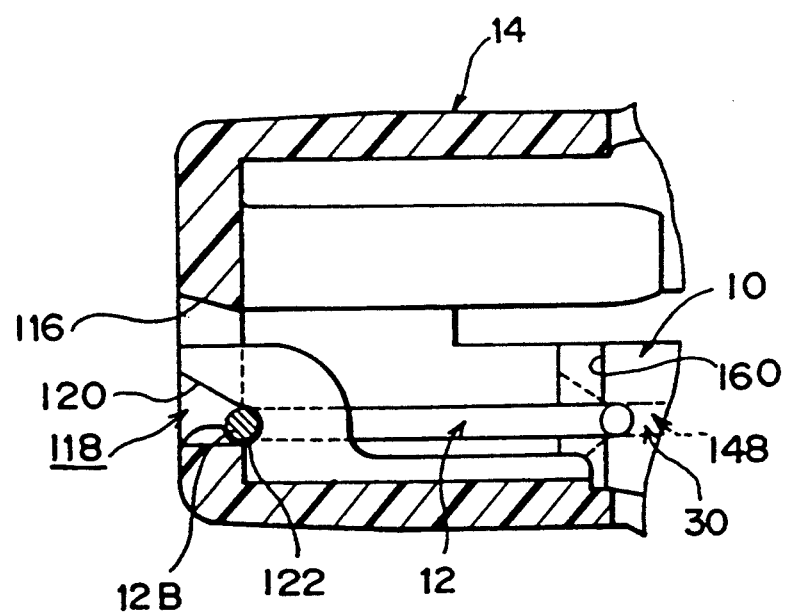

After the rear end portion 12B of the tracing member 12 has been moved to the guide holes 118, while the tip portions 12A of the tracing member 12 are being inserted into tapered guide portions 160 of the circulatory cam grooves 30, 148 while being guided by the guide plate 120, the rear end portion 12B is pushed into the fitting grooves 122, thereby completing the assembling operation (see FIG. 12).

It should be noted that the pushing in of the rear end portion 12B of the tracing member 12 can be facilitated if an appropriate pushing-in tool such as a screwdriver is used.

A description will now be given of a second embodiment of the second aspect of the invention.

Figure 13:
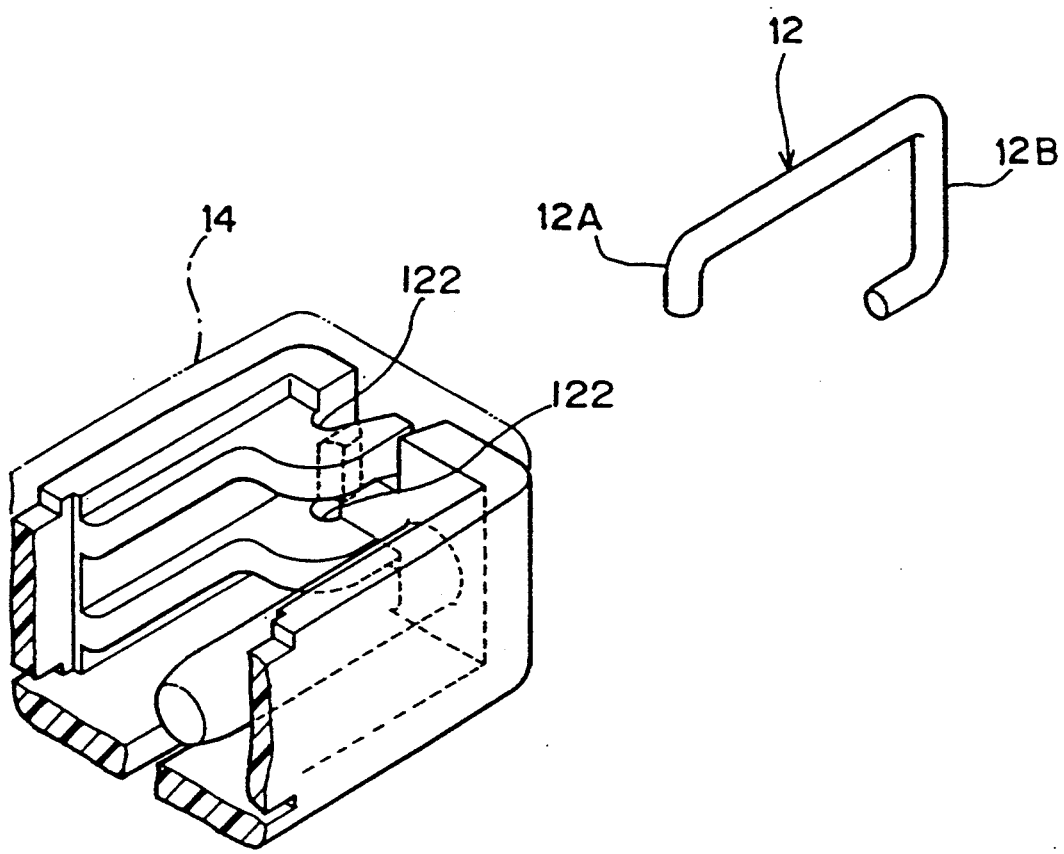
FIG. 13 is a perspective view illustrating the tracing-member fitting structure of the latch device in accordance with a second embodiment of the second aspect of the invention.
Figure 14:
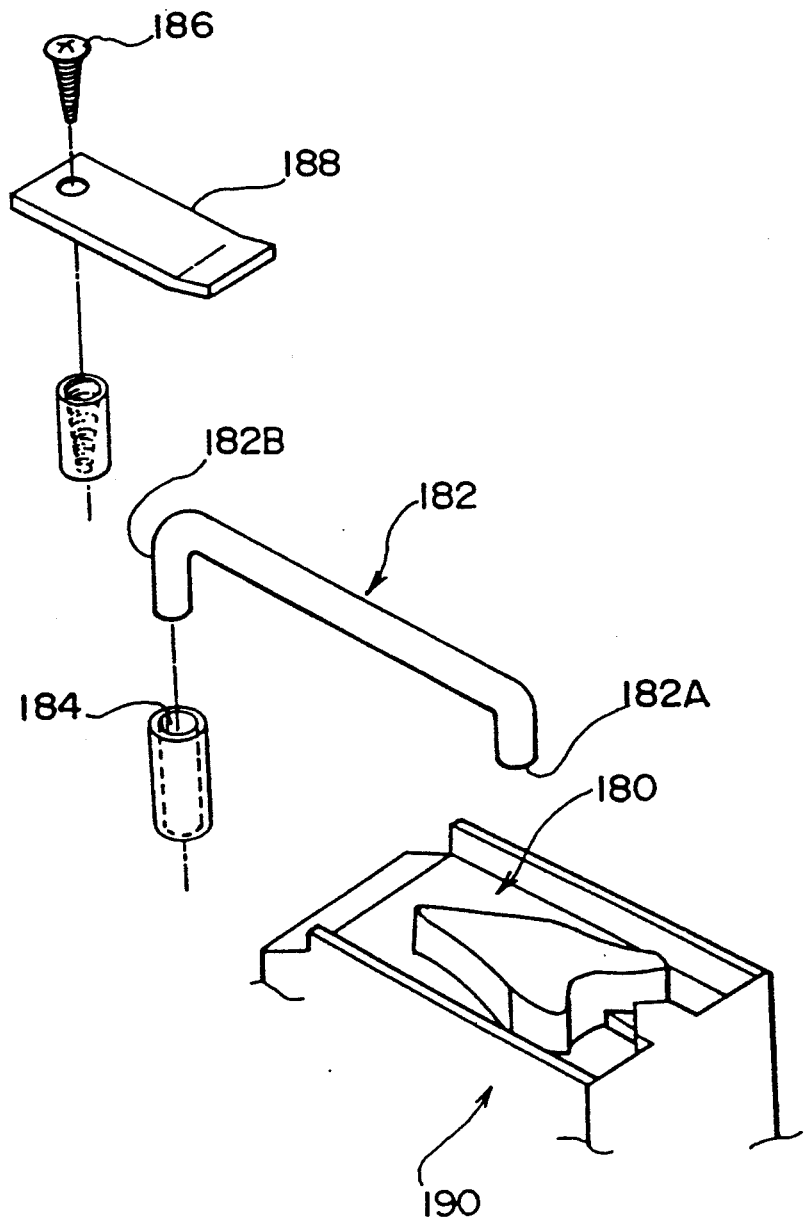
FIG. 14 is an exploded perspective view illustrating a component-parts fitting structure of a conventional latch device.

As shown in FIG. 13, the present invention is applicable to a structure in which a circulatory cam groove having a stepped portion is formed on only one surface of the latch body, as in the case of a conventional latch device.

That is, if the arrangement provided is such that the rear end portion 12B of the tracing member 12 is fitted by being received in the pair of fitting grooves 122, a fixing member for fitting the tracing member 12 is not required separately.

A description will now be given of a first embodiment of a third aspect of the invention.

Figure 15:
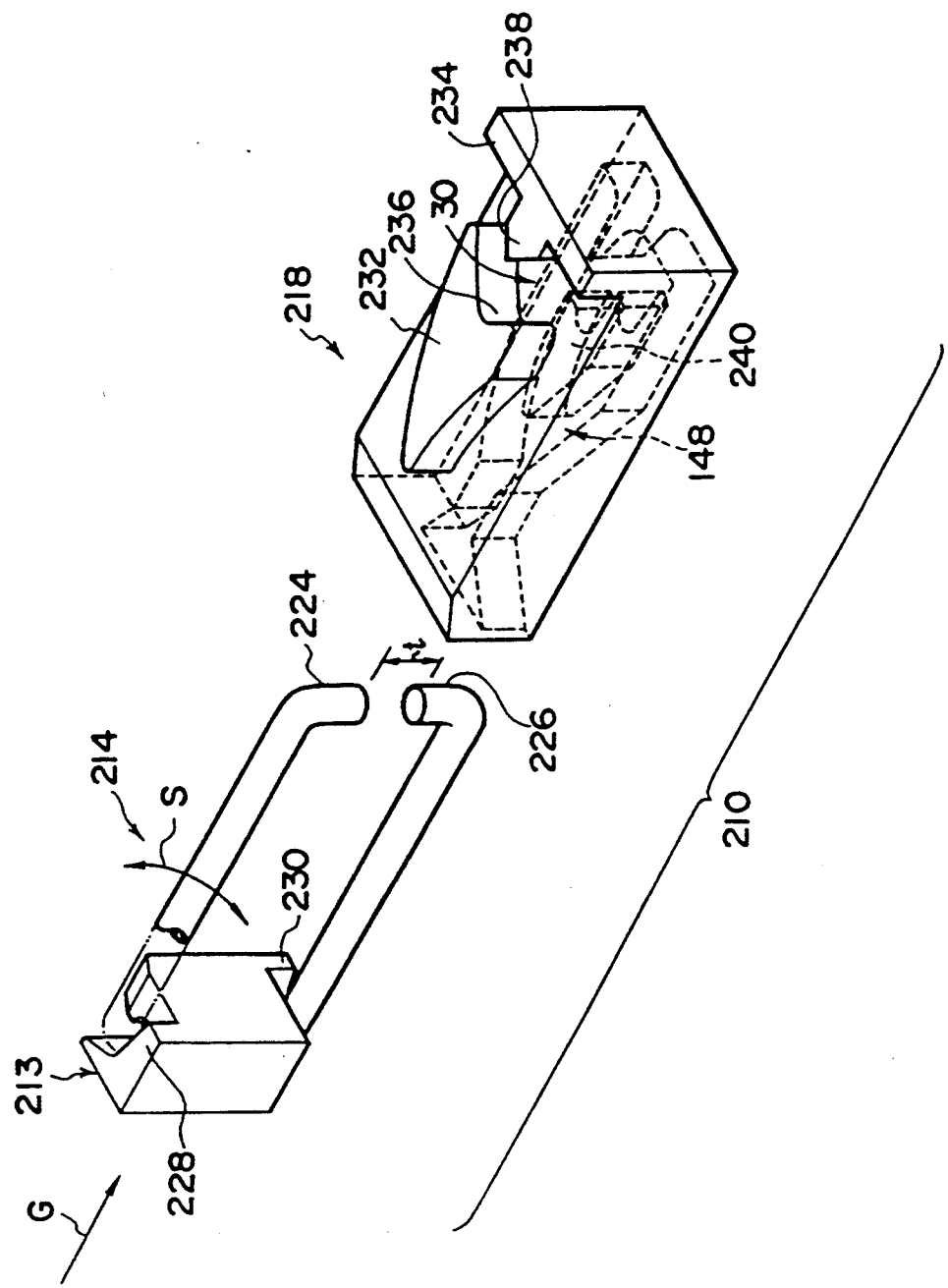
FIG. 15 is an overall perspective view of a lock mechanism in accordance with a first embodiment of a third aspect of the invention.
Figure 16:
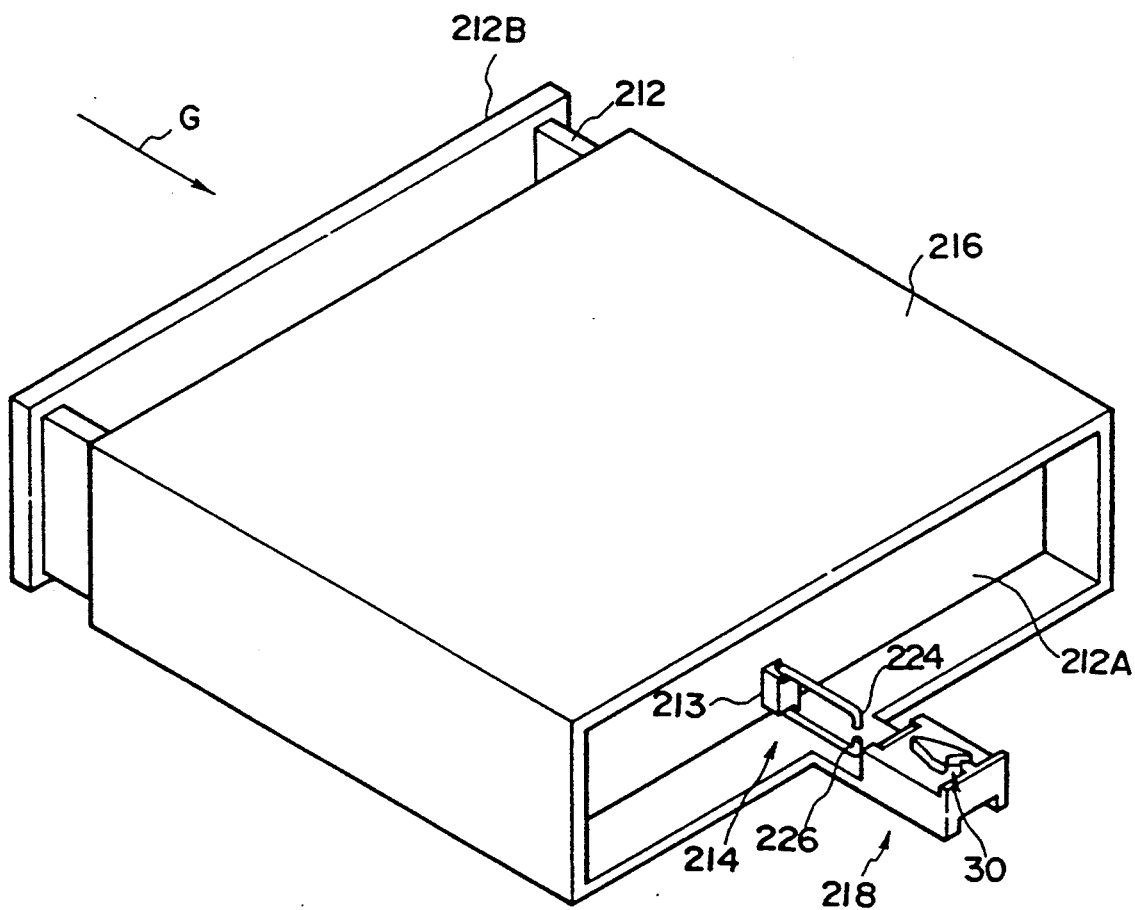
FIG. 16 is a perspective rear view of a push-type ash pan having the lock mechanism in accordance with the first embodiment of the third aspect of the invention.

FIGS. 15 and 16 illustrate a lock mechanism 210 which is applied to a push-open type ash pan in accordance with the first embodiment of the third aspect of the invention.

This lock mechanism comprises a tracing member 214 fitted on an insertion-side rear surface 212A of an ash pan case 212 (see FIG. 16) as well as a pair of circulatory cam grooves 30, 148 respectively formed on both sides of a circulatory-cam-groove fitting member 218 provided on the right-hand side of a box 216 as viewed in the drawing. The tracing member 214 is disposed on the rear surface 212A of the ash pan case 212 at a position corresponding to the circulatory cam grooves 30, 148. When a front surface 212B of the ash pan case 212 is pushed in the direction of arrow G, the tracing member 214 is adapted to be inserted into the pair of circulatory cam grooves 30, 148.

The tracing member 214 has a substantially C-shaped configuration formed by cutting off a portion of a ring. Opposite end portions of the tracing member 214 are formed as tracing portions 224, 226. The gap t between the ends of the tracing portions 224, 226 is set to be greater than the distance between the bottom surfaces of the circulatory cam grooves 30, 148. The arrangement provided is such that when the tracing portions 224, 226 of the tracing member 214 are inserted into the circulatory cam grooves 30, 148, the tracing member 214 moves in a circulating manner with the ends of the tracing portions 224, 226 not being brought into contact with the bottom surfaces of the circulatory cam grooves 30, 148, but with the tracing portions 224, 226 being brought into contact with the wall surfaces of the circulatory cam grooves 30, 148.

The tracing member 214 is supported on the rear surface 212A of the ash pan case 212 in such a manner as to be twistable in the direction of the double-headed arrow S (see FIG. 15), but retaining portions 228, 230 respectively formed in upper and lower portions of a fixing member 213 restrict the twisting motions of the tracing portions 224, 226 in the mutually closing direction.

The circulatory cam grooves 30, 148, which are respectively formed in the upper and lower surfaces of the circulatory-cam-groove fitting member 218, are provided with mutually different configurations.

The circulatory cam groove 30 shown by the solid lines has a configuration in which an upwardly projecting heart-shaped cam 232 is left uncut in a substantially central portion of the upper portion of the circulatory-cam-groove fitting member 218. A widthwise extending groove wall surface 234 is provided on the side of the circulatory-cam-groove fitting member 218 which is the insertion end side of the tracing member 214, and a projection 238 is formed in a central portion thereof in such a manner as to project toward a recessed portion 236 of the heart-shaped cam 232.

Meanwhile, a heart-shaped cam 240, a groove wall surface 242, and a projection 244 are formed on the circulatory cam groove 148 shown by the broken lines in the same way as the circulatory cam groove 30 but with different configurations. The tracing portion 224 circulating in the circulatory cam groove 30 and the tracing portion 226 circulating in the circulatory cam groove 148 are arranged to be spaced apart from each other by being pressed by the groove wall surfaces.

The recessed portion 236 disposed on the circulatory cam groove 30 is located at a position slightly offset in the direction of arrow G from a recessed portion 246 as seen in a plan view. This arrangement is provided to ensure that, in view of the tolerances of the tracing portions 224, 226, either one of the combinations of the tracing portion 224 and the recessed portion 236 on the one hand, and the tracing portion 226 and the recessed portion 246 on the other, is made to engage earlier than the other so as to positively lock the tracing member 214. It should be noted that since the tracing member 214 is extended by the urging force of the unillustrated compression coil, the offset of the recessed portions 236, 246 is canceled, so that the engaged tracing member 214 is supported at two points, i.e., the recessed portions 236, 246 (see FIG. 21).

In addition, although groove wall surfaces 248, 250 are formed on both sides of the circulatory cam groove 148 in an insertion direction of the tracing member 214, groove wall surfaces are not formed on the circulatory cam groove 30. The reason for this is that the tracing portion 224 is pressed against the wall surface of the heart-shaped cam 30 by the twisting force or torsion of the tracing member 214 and therefore does not move outside the circulatory cam groove 30. Even if the tracing portion 224 moves away from the heart-shaped cam 30, the tracing portion 224 is guided into an insertion portion 252 of the circulatory cam groove 30 by following the tracing portion 226 by virtue of the restoring force due to the twisting of the tracing member 214. Hence, it is unnecessary to form a groove wall surface for guiding the tracing portion 224 on the circulatory cam groove 30.

It should be noted that an insertion portion 252 of the circulatory-cam-groove fitting member 218 for the insertion of the tracing member 214 into the circulatory cam grooves 30, 248 is machined into a tapered configuration, so as to facilitate the tracing member 214.

The operation of this embodiment will now be described with reference to FIGS. 16 to 25.

Figure 17:
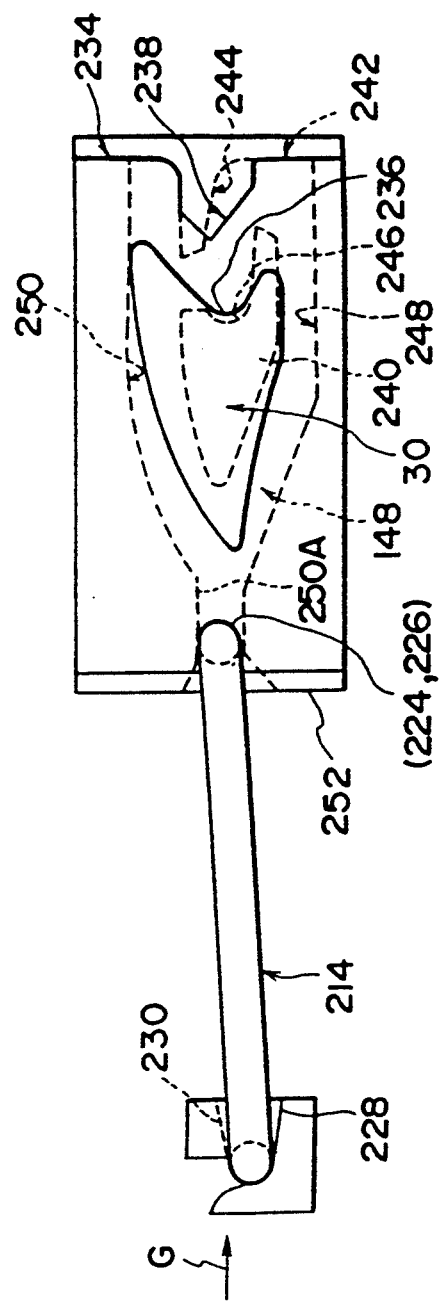
FIGS. 17 to 25 are plan views of the operating state of the tracing member with respect to a circulatory guide path of the lock mechanism during one cycle in accordance with the first embodiment of the third aspect of the invention.

In the state shown in FIG. 16, if the front surface 212B of the ash pan case 212 is pressed in the direction of arrow G, the tracing portions 224, 226 of the tracing member 214 fixed to the rear surface of the ash pan case 212 are respectively inserted into the circulatory cam grooves 30, 148 formed in both surfaces of the circulatory-cam-groove fitting member 218 fixed to the box 216 (FIG. 17).

Furthermore, if the front surface 212B of the ash pan case 212 is pressed further in the direction of arrow G, the tracing portion 226 of the tracing member 214 is guided along the wall surface 250 of the circulatory cam groove 148. Meanwhile, since no groove wall surface is formed on the insertion portion 252 of the circulatory cam groove 30, the tracing portion 224 moves by following the tracing portion 226.

Figure 18:
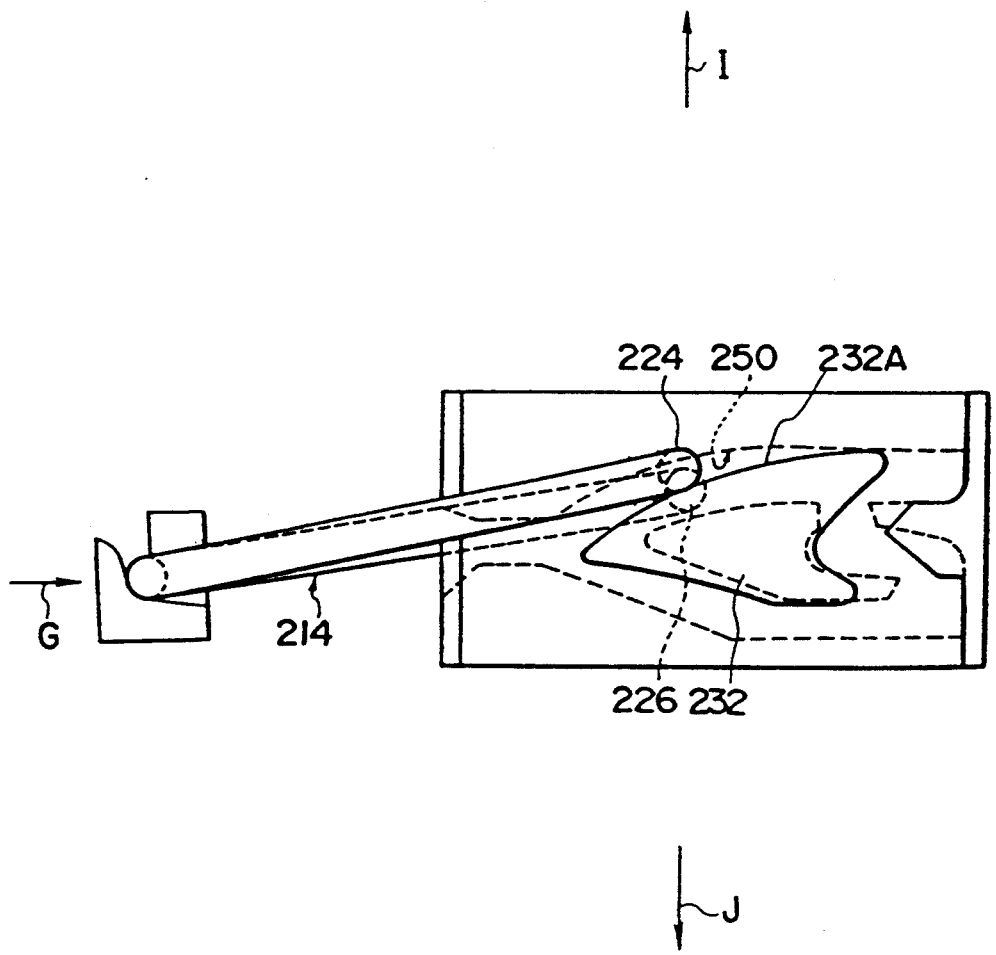

Then, as shown in FIG. 18, if the front surface 212B of the ash pan case 212 is pressed still further in the direction of arrow G, the tracing portion 226 moves in the direction of arrow J while being guided by the groove wall surface 250. Meanwhile, since the tracing portion 224 moves in the direction of arrow I while being guided by a heart-shaped cam 232A, the tracing portion 224 is gradually offset in the direction in which the tracing portions 224 and 226 are spaced apart from each other, so that a twisting force is produced in the tracing member 214.

Figure 19:
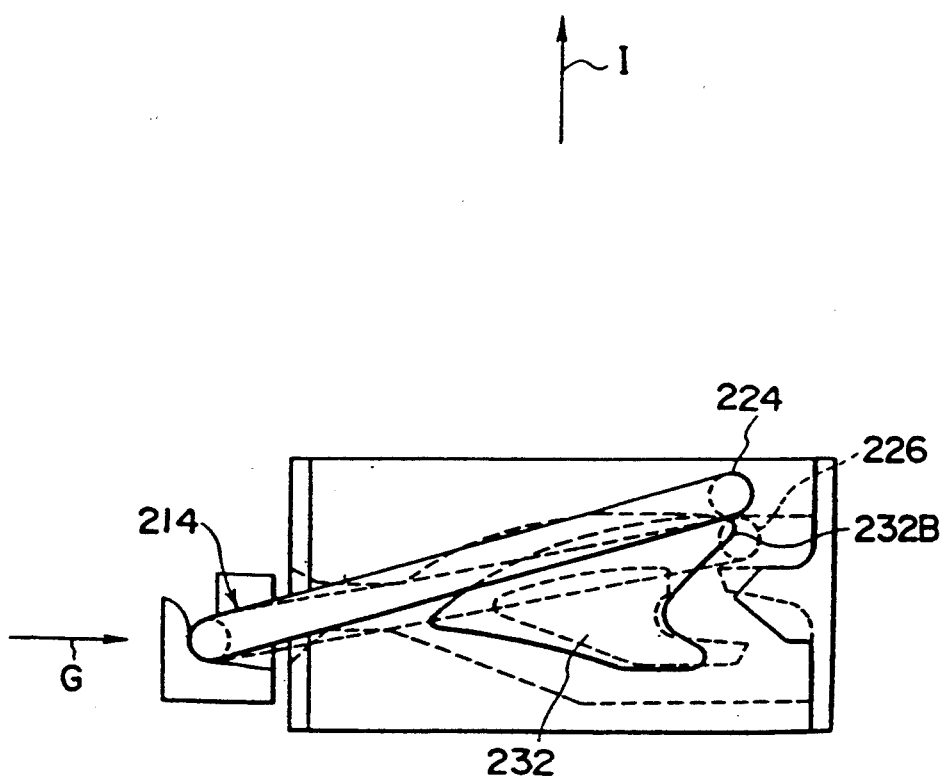

Then, as shown in FIG. 19, when the tracing portion 224 reaches an angular portion 232B of the heart-shaped cam 232, the offset between the tracing portions 224 and 226 becomes maximum, and the twisting force becomes maximum.

Then, in the state shown in FIG. 19, if the front surface 212B of the ash pan case 212 is pressed still further in the direction of arrow G, the tracing portion 224 moves in the direction of arrow J by riding over the angular portion 232B of the heart-shaped cam 232 by virtue of the torsion-restoring force. Then, the tracing portion 224 collides against a projection 238A of the groove wall surface 234 and clicks, and at the same time its positional offset with respect to the tracing portion 226 is canceled.

Figure 20:
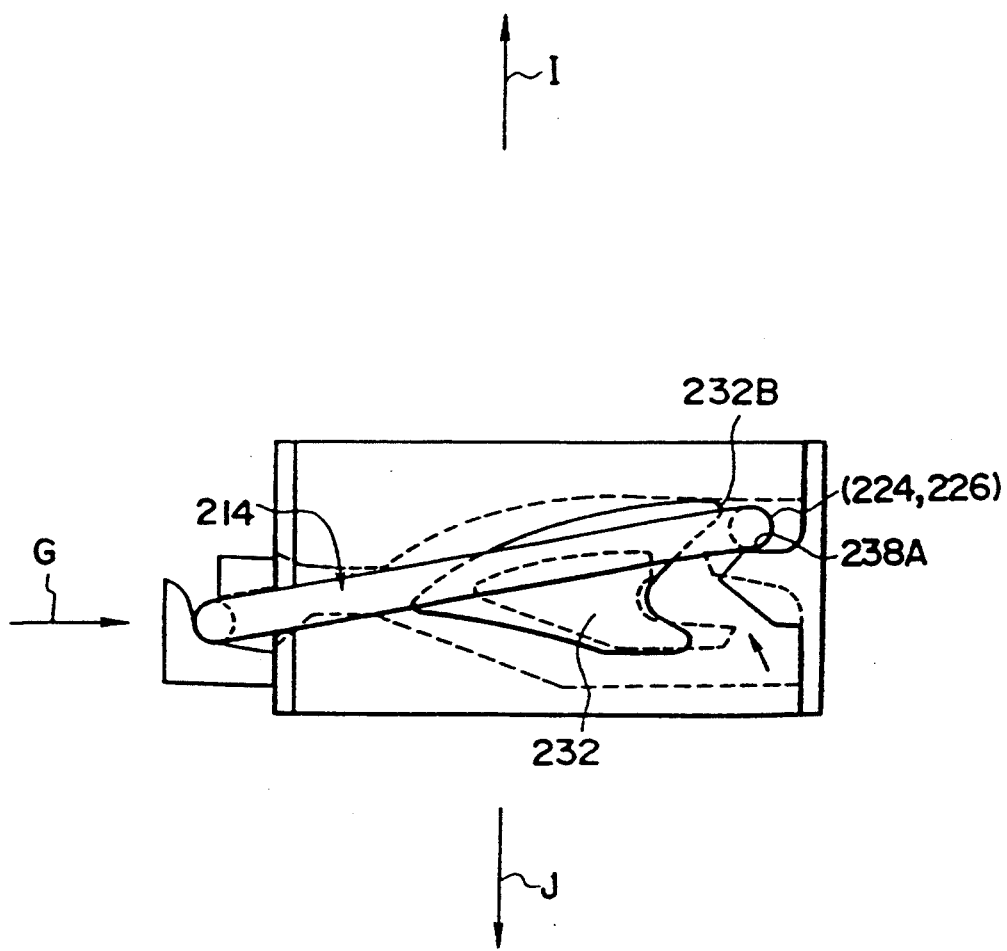
Figure 21:
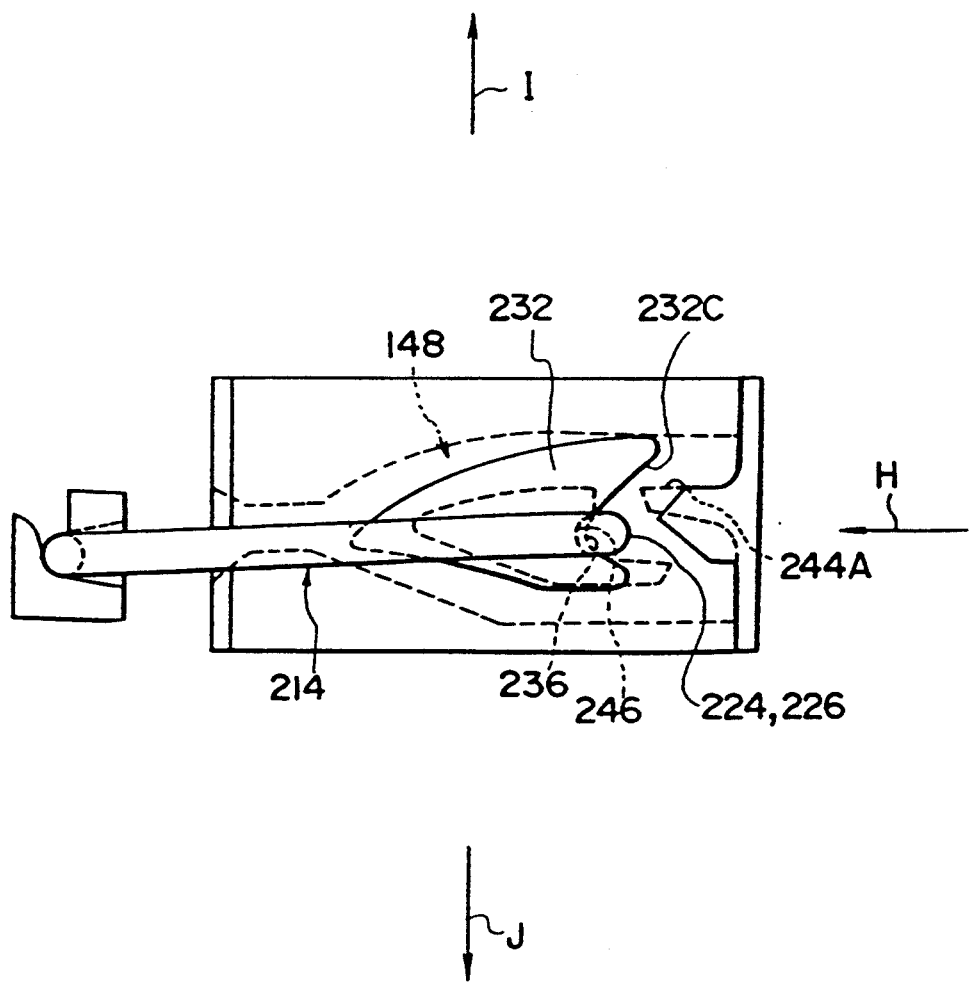
Figure 22:
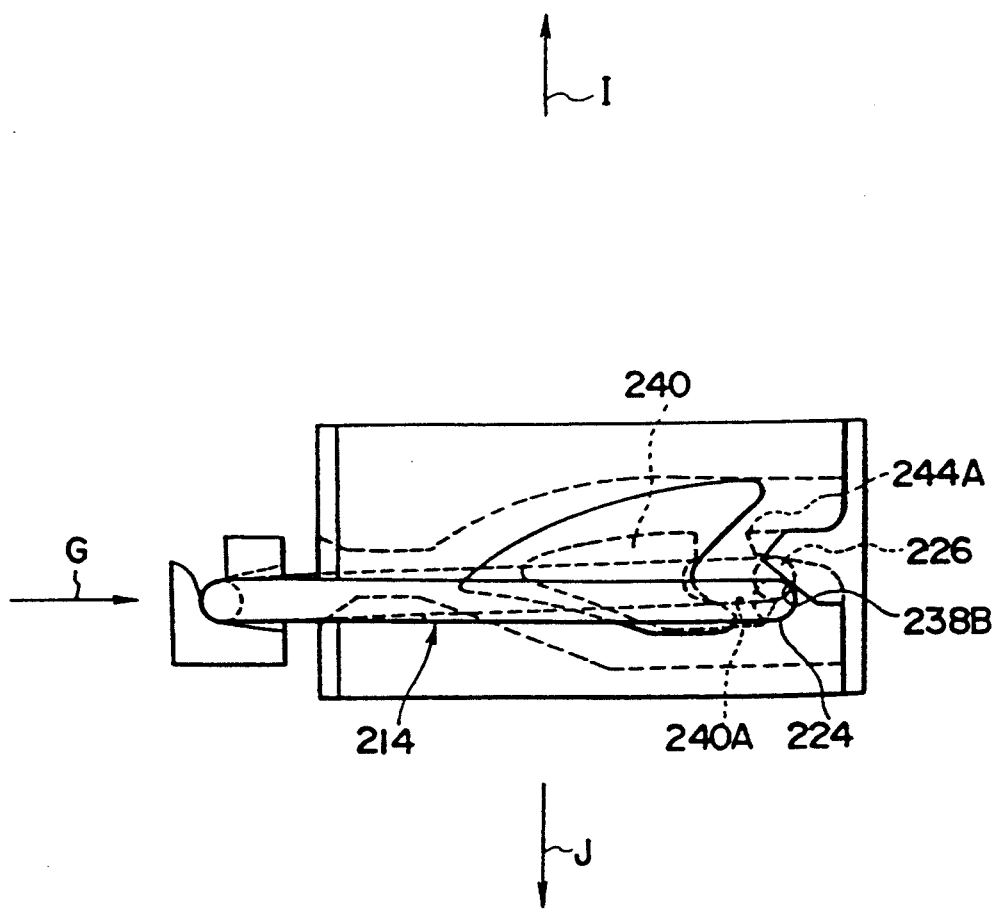

Subsequently, as shown in FIGS. 20 to 21, when an overstroke portion of the pressing operation is overcome by the urging force of the unillustrated compression coil spring, the tracing member 214 moves in the direction of arrow H. At this juncture, the tracing portion 224 is guided by a wall surface 232C of the heart-shaped cam 232, while the tracing portion 226 is guided by a projecting portion 244A of the projection 244 of the circulatory cam groove 148. That is, since the tracing portions 224 and 226 are respectively pressed in the direction of arrow J and in the direction of arrow I, torsion is produced in the tracing member 214. At this juncture, if the tracing member 214 moves further in the direction of arrow H, the tracing portion 226 is disengaged from the projecting portion 244A of the groove-wall surface, and its positional offset with respect to the tracing portion 224 is canceled by means of the restoring force. Consequently, the tracing portions 224, 226 whose positional offset has been canceled are guided by the wall surface 232C, and are retained at the recessed portions 236, 246.

At this juncture, since the prevention of the pulling out of the tracing member 214 is effected at two positions, i.e., the recessed portions 236, 246 on both surfaces of the circulatory-cam-groove fitting member 218, the tracing member 214 can be locked firmly.

Then, if the front surface 212B of the ash pan case 212 with the tracing member 214 in the locked state is pressed again, the tracing portion 226 and the tracing portion 224 move in the direction of arrow J while the former is being guided by a wall surface 240A of the heart-shaped cam 240 and the latter is being guided by a projection 238B of the groove wall surface. As a result, torsion is produced again in the tracing member 214. It should be noted that since the recessed portions 236, 246 are formed in such a manner as to be offset in the direction of arrow J from the tip of the projecting portion 244A on the groove wall surface, when the tracing member 214 is pressed again and an overstroke is created, the tracing portions 224, 226 are prevented from circulating in an opposite direction.

Figure 23:
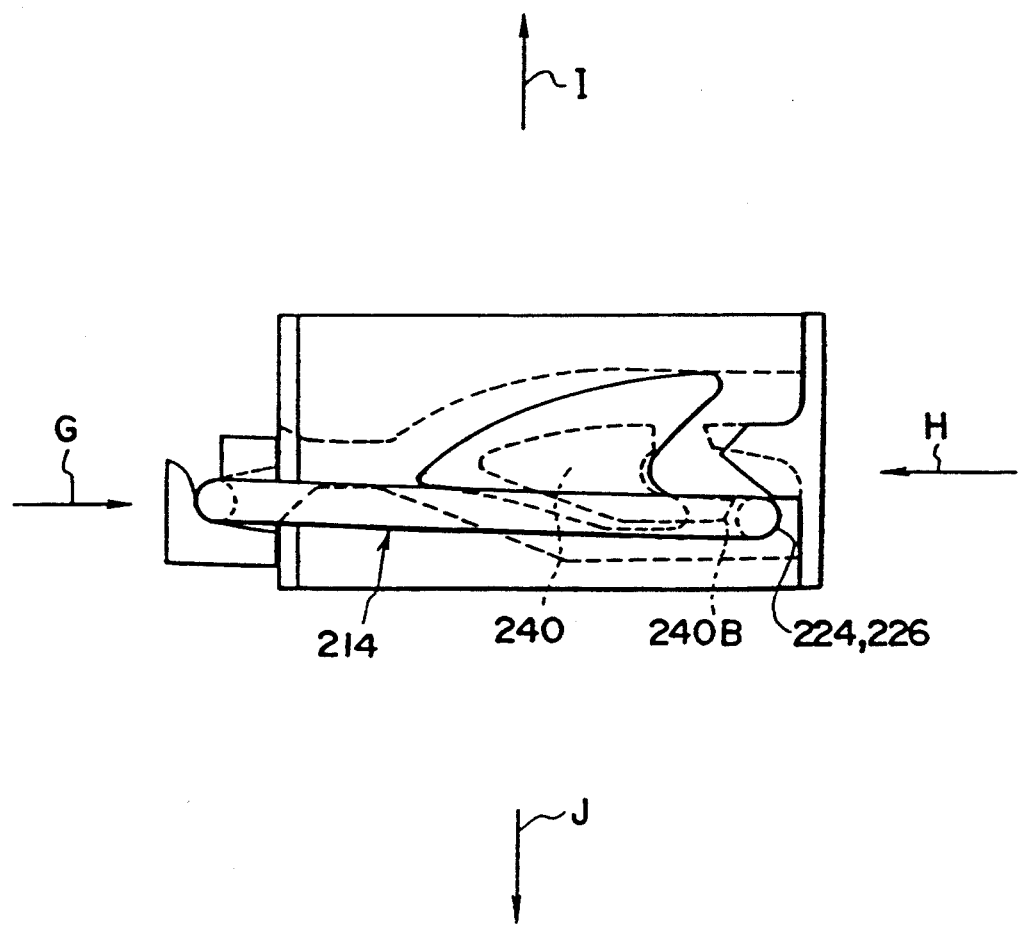

Then, if the front surface 212B of the ash pan case 212 with the tracing member 214 in the locked state is pressed further in the direction of arrow G, the tracing portion 226 rides over the tip of the wall surface 240A by means of the restoring force of the tracing member 214, cancels the positional offset with respect to the tracing portion 224, and assumes the state shown in FIG. 23.

In the state shown in FIG. 23, the overstroke of the tracing member 214 becomes maximum, and if the pressing in the direction of arrow G is canceled, the tracing member 214 is pushed back in the direction of arrow H by the urging force of the unillustrated compression coil spring. However, the tracing portion 226 is interfered by an angular portion 240B of the heart-shaped cam 240, so that it cannot move in the opposite direction to the circulating direction.

Figure 24:
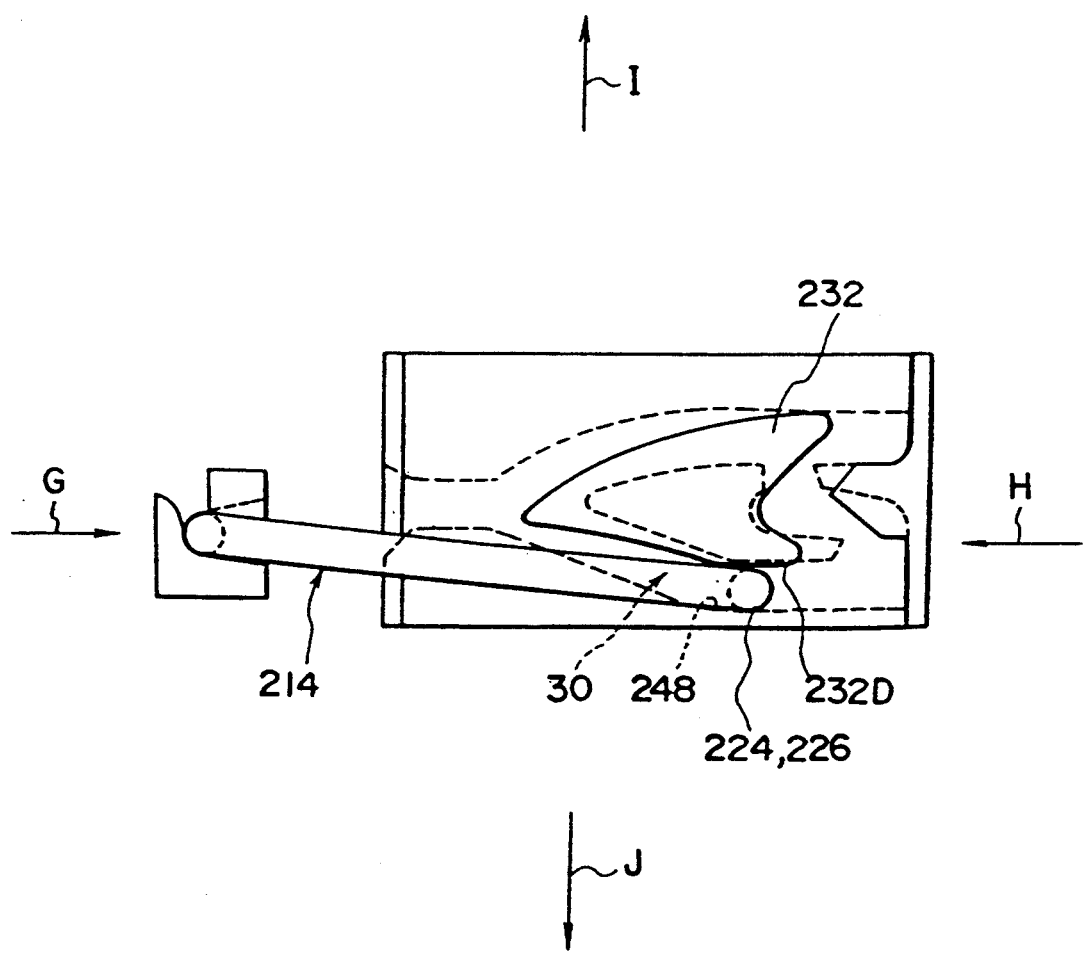

Furthermore, when the compression coil spring pushes back the tracing member 214 in the direction of arrow H as shown in FIG. 24, the tracing member 214 moves in the direction of arrow H with the tracing portions 224, 226 being guided by a wall surface 232D of the heart-shaped cam 232 and the wall surface 248 of the circulatory cam groove 30.

Figure 25:
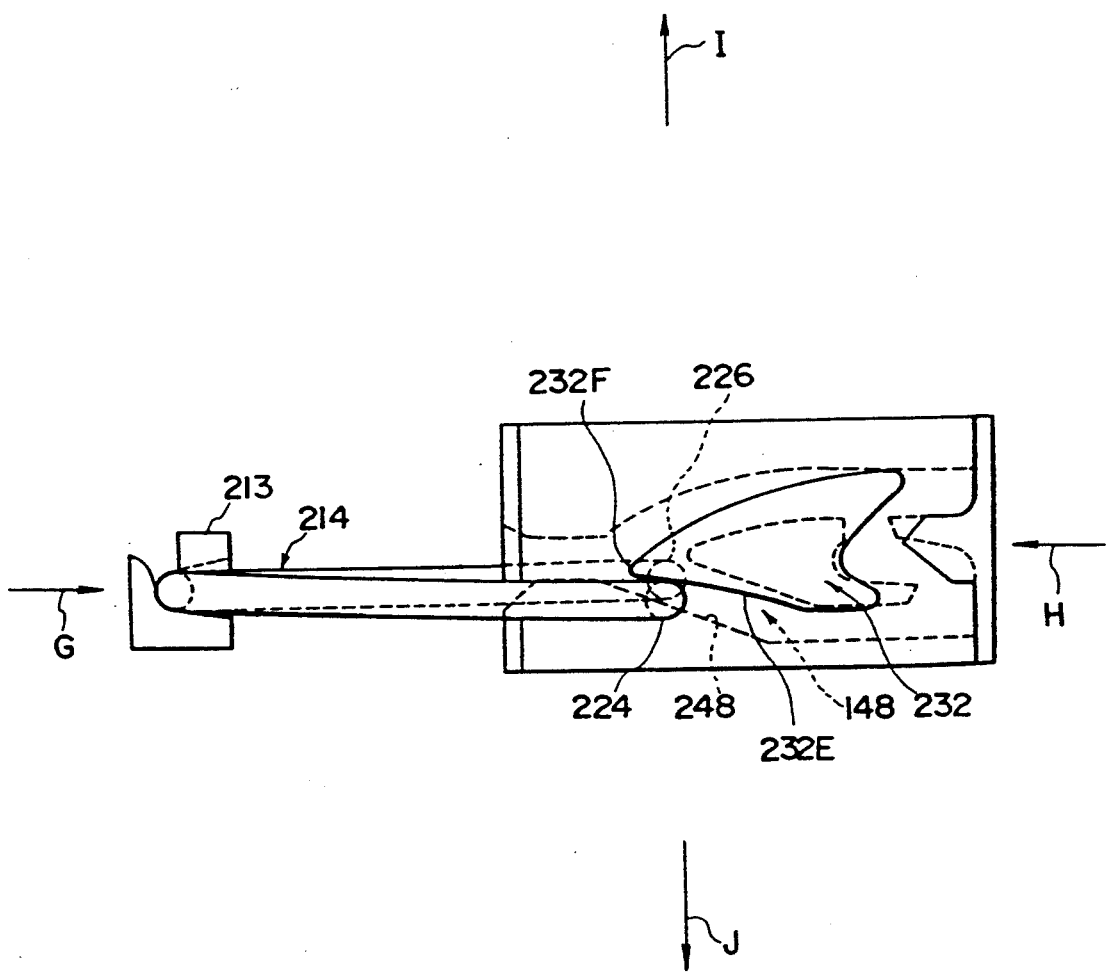

Then, as shown in FIG. 25, as the withdrawal of the tracing member 214 advances further, the tracing portion 226 moves in the direction of arrow I while being guided by the wall surface 248 of the circulatory cam groove 148. Meanwhile, since the tracing portion 224 moves in the direction of arrow J while being guided by a wall surface 232E of the heart-shaped cam 232, the positions of the tracing portions 224 and 226 are offset, whereupon a twisting force is produced again in the tracing member 214.

When the tracing portion 224 reaches a tip 232F of the heart-shaped cam 232, the positional offset between the tracing portions 224 and 226 becomes maximum, and the twisting force becomes maximum.

At this juncture, if the tracing portion 214 moves further in the direction of arrow H by being pushed back by the compression coil spring, at the same time as the tracing portion 224 leaves the tip 232F of the heart-shaped cam 232, the positional offset between the tracing portions 224 and 226 is canceled by means of the restoring force due to the twisting of the tracing member 214. When the tracing member 214 is further pulled back by the compression coil spring, the tracing member 214 leaves the circulatory cam grooves 30, 148, and the ash pan case 212 is pulled out of the box 216 (see FIG. 16).

It should be noted that although in the above-described embodiment a description has been given of a case in which the lock mechanism in accordance with the present invention is applied to a push-open type ash pan, the present invention is not restricted to the same. For instance, the lock mechanism in accordance with the present invention may be used as a means for locking an openable cover.

A description will now be given of a second embodiment of the third aspect of the present invention.

Figure 26:
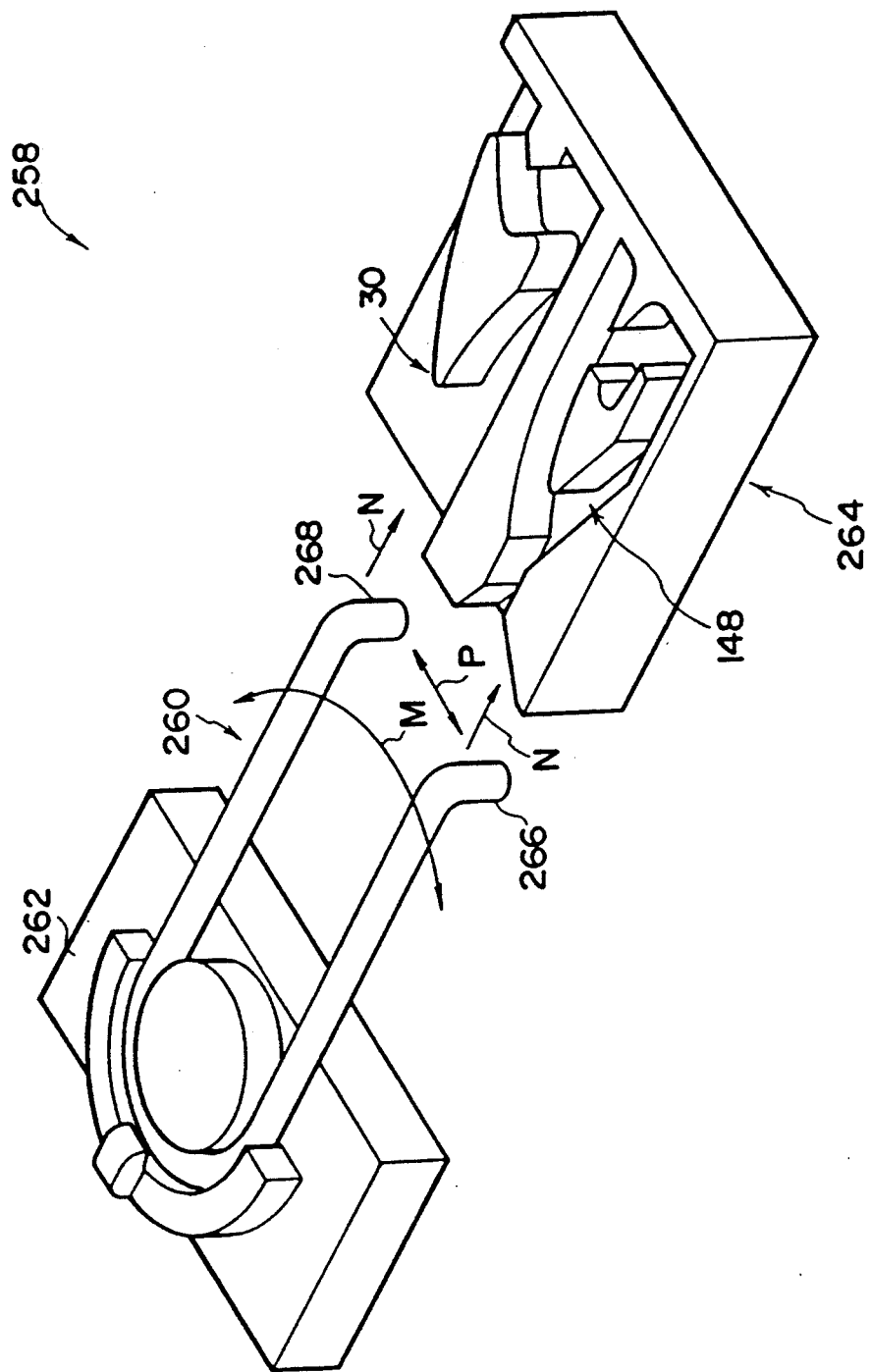
FIG. 26 is an overall perspective view of the lock mechanism in accordance with a second embodiment of the third aspect of the invention.

The first embodiment of the third aspect makes use of the resilient restoring force (torsion) of the tracing member 214 acting perpendicularly to the axis of the tracing member 214. In contrast, as shown in FIG. 26, this embodiment makes use of the resilient restoring force of a tracing member 260 acting parallel with the axis of a tracing member 260 so as to cause the tracing member 260 to circulate in a fixed direction.

That is, the circulatory cam grooves 30, 148 described in the first embodiment of the third aspect of the invention are provided on one surface of a circulatory-cam-groove fitting member 264, and a restoring force in a bending direction is produced in the tracing member 260 by positional offset in the direction of arrow P between tracing portions 266, 268 moving in a circulating manner after being inserted into the circulatory cam grooves 30, 148 in the direction of arrow N. By virtue of this restoring force in the bending direction, the tracing member 260 is circulated in a fixed direction.

According to this arrangement, since it is unnecessary to provide the circulatory cam grooves 30, 148 on both surfaces of the circulatory-cam-groove fitting member 264, the lock mechanism 258 can be made thin.

A description will now be given of a fourth aspect of the present invention.

Figure 27:
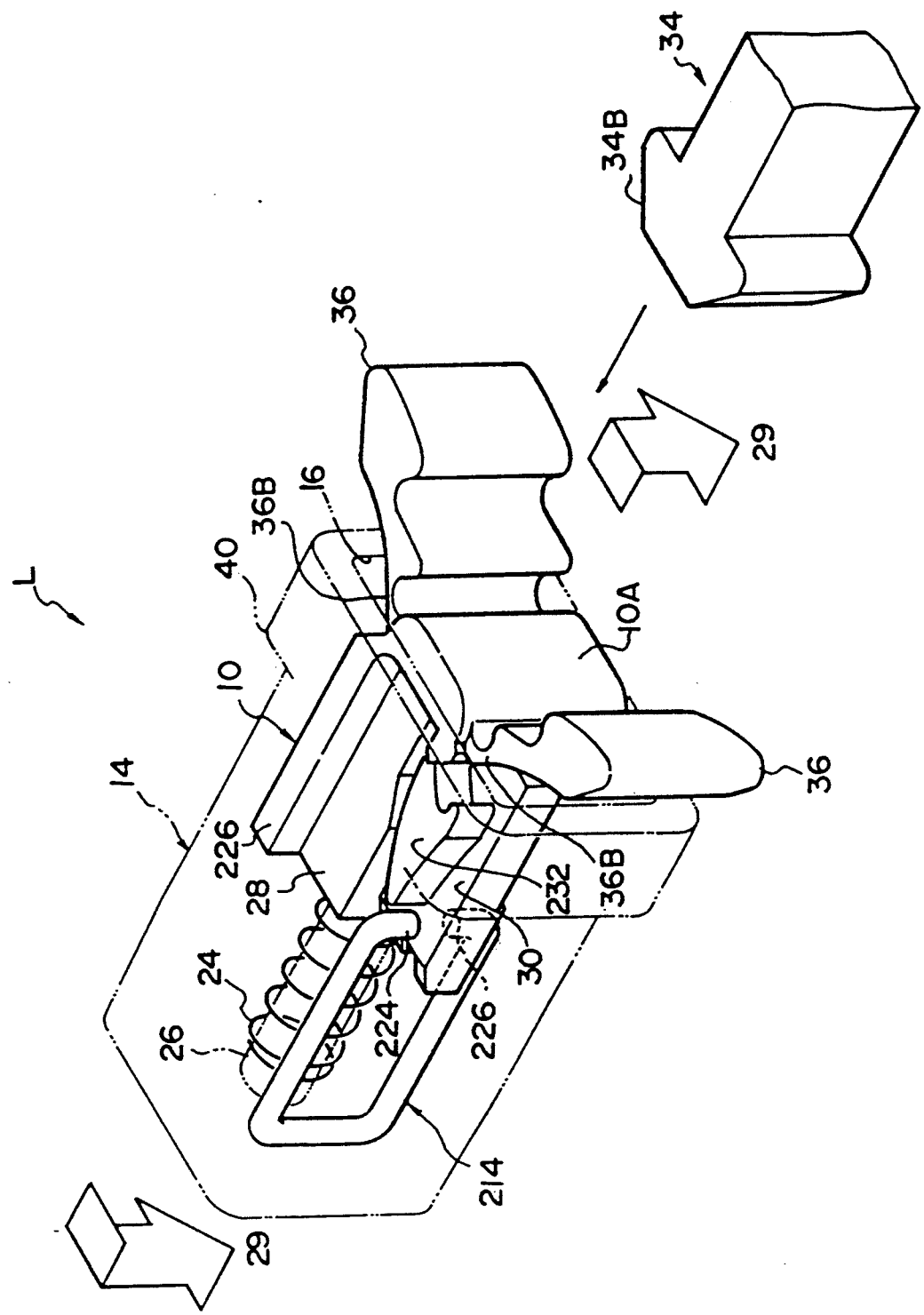
FIG. 27 is an overall perspective view of the latch device in accordance with an embodiment of a fourth aspect of the invention.

FIG. 27 shows a latch device L to which the lock mechanism 210 in accordance with the present invention is applied.

Since the external configurations of the latch body 210 and the housing 214 and the structure of the compression coil spring 24 are the same as those described in the embodiment of the first aspect of the invention. Therefore, these component parts and their portions will be denoted by the same reference numerals, and a description thereof will be omitted here.

The recessed portion 28 is formed on each of the top surface 226 and the unillustrated bottom surface of the latch body 10. The circulatory cam grooves 30, 148 described in the first embodiment of the third aspect are formed on the recessed portions 28, respectively, and the tracing portions 224, 226 of the tracing member 214 are inserted into the circulatory cam grooves 30, 148, and move in a circulating manner in the circulatory cam grooves 30, 148 while being brought into contact with the wall surfaces of the circulatory cam grooves. It should be noted that in this embodiment the wall surface 248 provided on the circulatory cam groove 148 described in the first embodiment of the third aspect of the invention is not provided, and is substituted by an inner wall 14A of the housing 14 so as to make the latch device compact.

The portion of the tracing member 214 remote from the tracing portions 224, 226 is twistably fixed on the inner wall of the housing 14.

Figure 28:
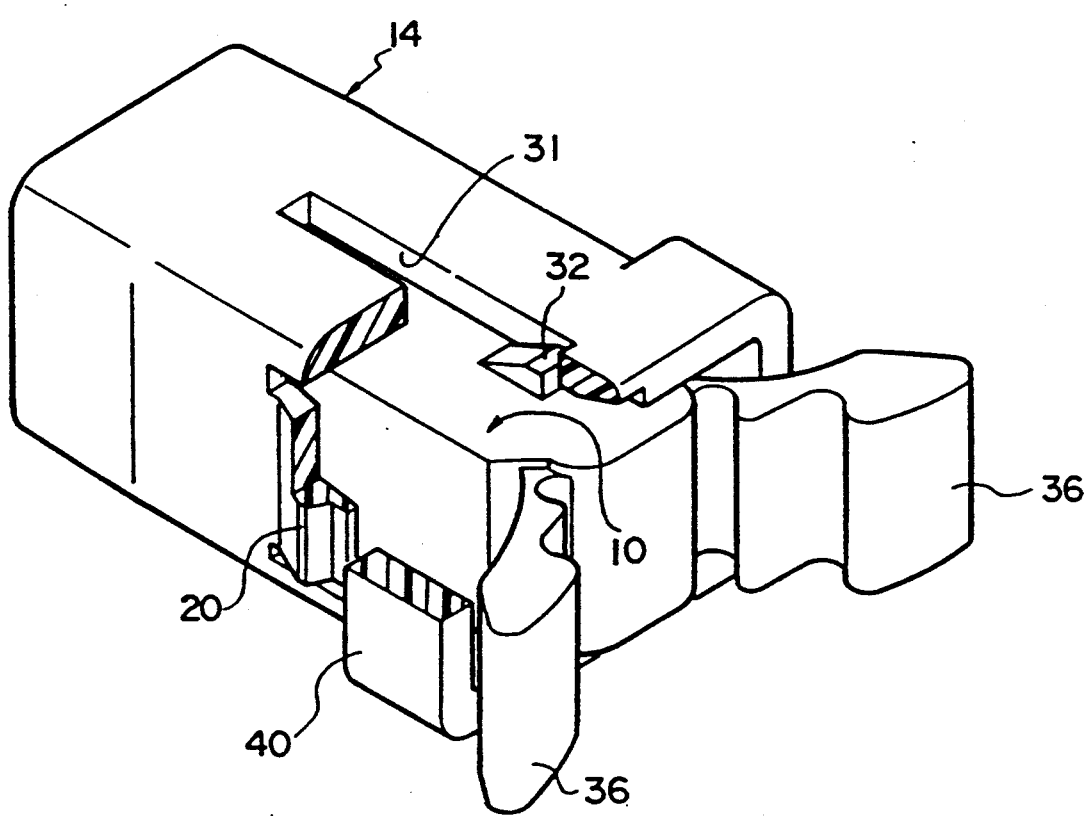
FIG. 28 is a partially cut-away perspective view of the latch device in accordance with the fourth aspect of the invention.

As shown in FIG. 28, the projection 32 is formed on the top surface of the latch body 10, and is fitted in the elongated guide hole 31 formed in the housing 14. As a result, as the projection 32 moves in the elongated guide hole 31, the latch body 10 is moved reciprocatively relative to the housing 14. Also, as the projection 32 is brought into contact with one end of the elongated guide hole 31, further movement of the latch body 10 in the direction in which it is pulled out is prevented against the urging force of the compression coil spring 24.

As shown in FIG. 27, the pair of arms 36 are provided on the side of the latch body 10 which is remote from the insertion side of the housing 14, and their distal ends are spaced apart from each other. The enlarged-diameter end portion 34B of the striker 34 secured to an unillustrated openable cover is inserted between the arms 36 to press the central portion 10A of the arms 36, so as to push the latch body 10 into the housing 14.

The operation of this embodiment will be described hereinbelow.

Before the latch body 10 is pressed by the enlarged diameter end portion 34B of the striker 34 (see FIG. 27), the projection 32 formed on the latch body 10 is retained at one end of the elongated guide hole 31 (see FIG. 28), so that the latch body 10 is prevented from being pulled out. At this juncture, as shown in FIG. 27, the arms 36 are in an open state, and the tracing portions 224, 226 of the tracing member 214 are at a tip portion 237 of the latch body 10.

Figure 29:
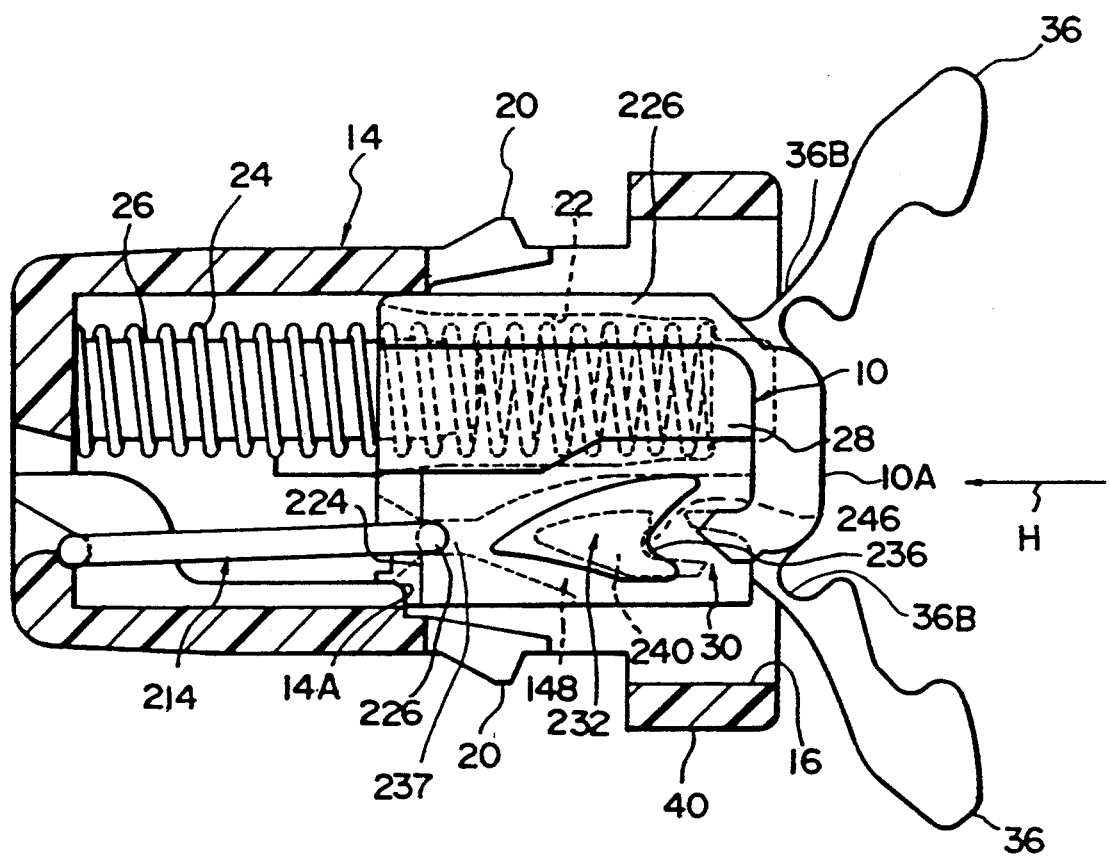
FIG. 29 is a cross-sectional view of the latch device in accordance with the fourth aspect of the invention taken along the line 29—29 of FIG. 27.
Figure 30:
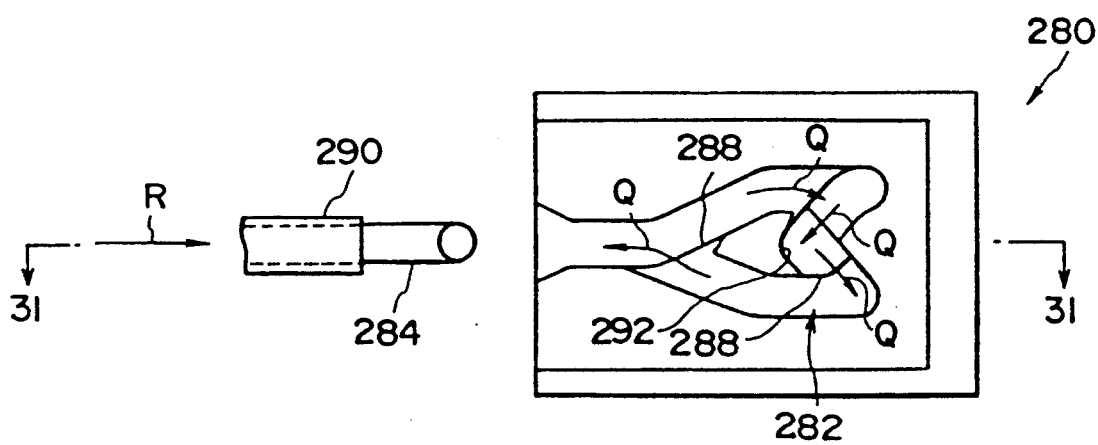
FIG. 30 is a plan view of a circulatory cam groove and a tracing member of a conventional lock mechanism.
Figure 31:
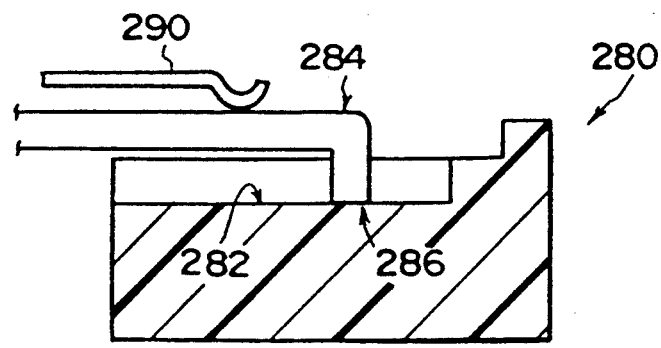
FIG. 31 is a cross-sectional view of a conventional lock mechanism 280 taken along the line 31—31 of FIG. 16.

In the state shown in FIG. 29, if the central portion 10A of the arms 36 is pressed by the striker 34 to push the latch body 10 into the housing 14, the outer sides of the arms 36 are brought into contact with the rectangular frame 16, and the arms 36 rotate in the mutually approaching direction with the hinges 36B. As a result, the enlarged-diameter end portion 34B of the striker are held by the arms 36, thereby closing the openable cover.

At this juncture, the tracing portions 224, 226 of the tracing member 214 are guided along the groove wall surfaces of the circulatory cam grooves 30, 148, engage the recessed portions 236, 246, respectively, thereby preventing the latch body 10 from coming off.

It should be noted that since the operation and effect of the tracing member 214 relative to the circulatory cam grooves 30, 148, are the same as those of the first embodiment of the third aspect of the invention, a description thereof will be omitted.

Although in this embodiment stepped portions are not provided on the circulatory cam grooves 30, 148, it is possible to provide each surface of the latch body 10 with a circulatory cam groove having conventional stepped portions, and to allow the tracing member 214 of this embodiment to trace the grooves. However, in order to make the latch device compact, it is preferable not to provide the circulatory cam groove with stepped portions.

In addition, although in this embodiment the side surface portions of the distal ends of the tracing member 214 are formed as the tracing portions, if the circulatory cam grooves are formed of a hard material, the circulatory cam grooves may be traced by the end faces of the tracing member 214.

What is claimed is:

1. A latch device for causing an openable member to engage with or disengage from a main body, comprising:
   a housing fitted on said main body;
   a striker fitted on said openable member; and
   a latch body which is retained by said housing in a first state in which said latch body is pushed into said housing in an engaging direction and in a second state in which said latch body is partially withdrawn from said housing in a disengaging direction;
   a pair of arms extending along a first direction away from said latch body for clamping said striker by rotating in a mutually approaching direction,
   wherein the center of rotation of each of said arms is formed on substantially the same line as a line of action of a force acting on a retaining surface of each of said arms, each arm comprising an outer side surface E which originates at said latch body and extends along said first direction past its respective center of rotation, said outer side surface E being rectilinear and parallel with its respective line of action while said latch body is in said first state, said retaining surface preventing separation of said striker from said latch body, said force resulting from a pulling force W acting in said disengaging direction.

2. A latch device for causing an openable member to engage with or disengage from a main body, comprising:
   a housing fitted on said main body;
   a striker fitted on said openable member; and
   a latch body which is retained by said housing in a first state in which said latch body is pushed into said housing in an engaging direction and in a second state in which said latch body is partially withdrawn from said housing in a disengaging direction, said latch body having a pair of arms for clamping said striker by rotating in a mutually approaching direction;
   each of said arms having a hinge portion such that each of said arms rotate about said hinge portion in said mutually approaching direction to clamp said striker, said hinge portion having a reduced thickness relative to a thickness of the remaining portions of each of said arms;
   wherein the center of rotation of each of said arms is formed on substantially the same line as a line of action of a force acting on a retaining surface of each of said arms, said retaining surface preventing separation of said striker from said latch body, said force resulting from a pulling force W acting in said disengaging direction.

3. The latch device of claim 2, wherein an outer side of a central portion of rotation of each of said arms is substantially rectilinear.

4. The latch device of claim 3, wherein said outer side is parallel with said line of action.

* * * * *